United States Patent
Lin

(10) Patent No.: US 11,746,819 B2
(45) Date of Patent: Sep. 5, 2023

(54) MULTIFUNCTION DRILL BIT WITH A REPLACEABLE TIP

(71) Applicant: Yu-Ju Lin, Kaohsiung (TW)

(72) Inventor: Yu-Ju Lin, Kaohsiung (TW)

(73) Assignee: Wen-Pin Huang, Kaohsiung (TW)

( * ) Notice: Subject to any disclaimer, the term of this patent is extended or adjusted under 35 U.S.C. 154(b) by 323 days.

(21) Appl. No.: 17/095,794

(22) Filed: Nov. 12, 2020

(65) Prior Publication Data

US 2021/0062857 A1 Mar. 4, 2021

(51) Int. Cl.
| F16B 13/06 | (2006.01) |
| F16B 19/08 | (2006.01) |
| F16B 39/02 | (2006.01) |
| F16B 13/00 | (2006.01) |

(52) U.S. Cl.
CPC .......... *F16B 39/025* (2013.01); *F16B 13/003* (2013.01); *F16B 13/061* (2013.01); *F16B 19/083* (2013.01)

(58) Field of Classification Search
CPC .... F16B 13/003; F16B 13/002; F16B 13/061; F16B 19/083; F16B 19/1072
USPC ................................................ 411/29, 34, 38
See application file for complete search history.

(56) References Cited

U.S. PATENT DOCUMENTS

| 3,772,957 | A | * | 11/1973 | Newton | ................ | F16B 11/006 |
| | | | | | | 411/930 |
| 4,920,833 | A | * | 5/1990 | Rosenthal | ........... | B25B 27/0014 |
| | | | | | | 411/40 |
| 6,186,716 | B1 | * | 2/2001 | West | ...................... | F16B 13/002 |
| | | | | | | 411/30 |
| 6,796,759 | B2 | * | 9/2004 | Aasgaard | .............. | F16B 37/065 |
| | | | | | | 411/29 |
| 7,654,781 | B2 | * | 2/2010 | McDuff | ................ | F16B 13/061 |
| | | | | | | 411/30 |
| 2006/0067803 | A1 | * | 3/2006 | Hsu | ........................ | F16B 35/041 |
| | | | | | | 411/29 |
| 2010/0239384 | A1 | * | 9/2010 | Lu | ......................... | F16B 13/061 |
| | | | | | | 411/30 |
| 2011/0116894 | A1 | * | 5/2011 | Huang | .................. | F16B 25/103 |
| | | | | | | 411/387.4 |
| 2018/0209466 | A1 | * | 7/2018 | Chao | .................... | F16B 25/0078 |

* cited by examiner

Primary Examiner — Flemming Saether

(57) ABSTRACT

A multifunction drill bit includes an outer shank including an outer lock head, an outer shank body, and an axial hole wherein spiral grooves are on the outer shank body; from a joining portion of the outer shank body and the outer lock head to the outer lock head, a threaded section, a deformable section, and a guide section are provided; each of the threaded and deformable sections include first external threads; the deformable section has outer curved grooves; a deformable concave surface is on an inner surface of the deformable section; and first internal threads are on the guide section; and an inner shank in the axial hole and including a top socket, an inner lock head, and an inner shank body. Second external threads are on an inner surface of the guide section corresponding to the first internal threads. A tip of the drill bit is replaceable.

1 Claim, 31 Drawing Sheets

MULTIFUNCTION DRILL BIT WITH A REPLACEABLE TIP

BACKGROUND OF THE INVENTION

1. Field of the Invention

The invention relates to drill bits and more particularly to a multifunction drill bit being capable of fastening one or more workpieces or being fastened in concrete and having a replaceable tip.

2. Description of Related Art

Conventionally, a drilling machine is used to drill a hole in a workpiece prior to driving a rivet or expansion screw into the hole. Next, an electric wrench is used to fasten the rivet or expansion screw. However, at least two tools are required to fasten the rivet or the expansion screw in view of the current working procedure. Thus, it is desirable to combine the drilling and fastening steps as a single step because it not only saving the number of tools used but also saving working time.

SUMMARY OF THE INVENTION

It is therefore one object of the invention to provide a multifunction drill bit capable of being equipped with one of a plurality of different tips and having the function of an expansion screw or rivet.

In a first aspect of the invention, there is provided a multifunction drill bit comprising an outer shank including an outer lock head, an outer shank body formed with the outer lock head, and an axial hole through both the outer shank body and the outer lock head wherein a plurality of spiral grooves are provided on the outer shank body for discharging chips; from a joining portion of the outer shank body and the outer lock head to the outer lock head, there are sequentially provided a threaded section, a deformable section, and a guide section; each of the threaded section and the deformable section include first external threads; the deformable section has a plurality of curved grooves on an outer surface; a deformable concave surface is provided on an inner surface of the deformable section; and a plurality of first internal threads are provided on an inner surface of the guide section; and an inner shank provided in the axial hole and including an inner lock head and an inner shank body formed with the inner lock head wherein a plurality of second external threads are provided on an inner surface of the guide section adjacent to an end and distal the inner lock head, the second external threads corresponding to the first internal threads; and a socket provided on a top of the inner lock head.

Preferably, a pitch of the spiral grooves is increased as a distance to an end of the outer shank increases, and an inclined angle of the spiral grooves with respect to a horizontal line is defined as $$60°-5°\times(\text{a thread height calculated from an end of the guide section}/\text{a diameter of the outer shank}).$$

Preferably, the number of the spiral grooves is at least two times of the number of each of the threaded section and the guide section.

Preferably, further comprises a tip releasably secured to an end of the guide section, the tip being configured to drill a metal workpiece and including a joining section and a drilling section formed with the joining section wherein a plurality of third external threads are provided on an outer surface of the joining section corresponding to the first internal threads; the drilling section sequentially includes, distal the joining section, a cutting surface, a plurality of spirals, and a plurality of threads; the cutting surface includes a first cutting face, a second cutting face, and a third cutting face; angles of the first cutting face, the second cutting face, and the third cutting face with respect to an end of the tip are different; and a plurality of spiral grooves are provided on the threads for discharging chips.

Preferably, further comprises a tip releasably secured to an end of the guide section, the tip being configured to drill concrete and including a joining section and a drilling section formed with the joining section wherein a plurality of third external threads are provided on an outer surface of the joining section corresponding to the first internal threads; the drilling section sequentially includes, distal the joining section, a cutting surface, a plurality of spirals, and a plurality of threads; the cutting surface includes a first cutting face, a second cutting face, and a third cutting face; and angles of the first cutting face, the second cutting face, and the third cutting face with respect to an end of the tip are different.

Preferably, the angles of the first cutting face, the second cutting face, and the third cutting face with respect to the end of the tip are increased counterclockwise.

Preferably, the angle of the first cutting face with respect to the end of the tip is 30-degree, the angle of the second cutting face with respect to the end of the tip is 30.1 to 31-degree, and the angle of the third cutting face with respect to the end of the tip is 31.1 to 32-degree.

Preferably, the inner lock head includes a socket on a top.

Preferably, the inner lock head includes an adapter section includes a socket on a top, further comprises a plurality of second external threads provided on an inner surface of the guide section adjacent to an end and distal the inner lock head, the second external threads corresponding to the first internal threads.

Preferably, the adapter section includes a projecting connection rod on a top, and the projecting connection rod includes a plurality of fourth external threads on an outer surface.

Preferably, the adapter section includes a projecting connection rod on a top, and the projecting connection rod includes a plurality of fourth external threads on an outer surface.

The multifunction drill bit of the invention has the following advantageous effects in comparison with the prior art: the tip can be replaced with one appropriate for drilling a hole through metal workpieces and fastening same or one appropriate for drilling a hole in concrete and being fastened therein based on a kind of target. Thus, a single operation can not only drill a hole but also fasten the target.

The above and other objects, features and advantages of the invention will become apparent from the following detailed description taken with the accompanying drawings.

DETAILED DESCRIPTION OF THE INVENTION

Figure 1:
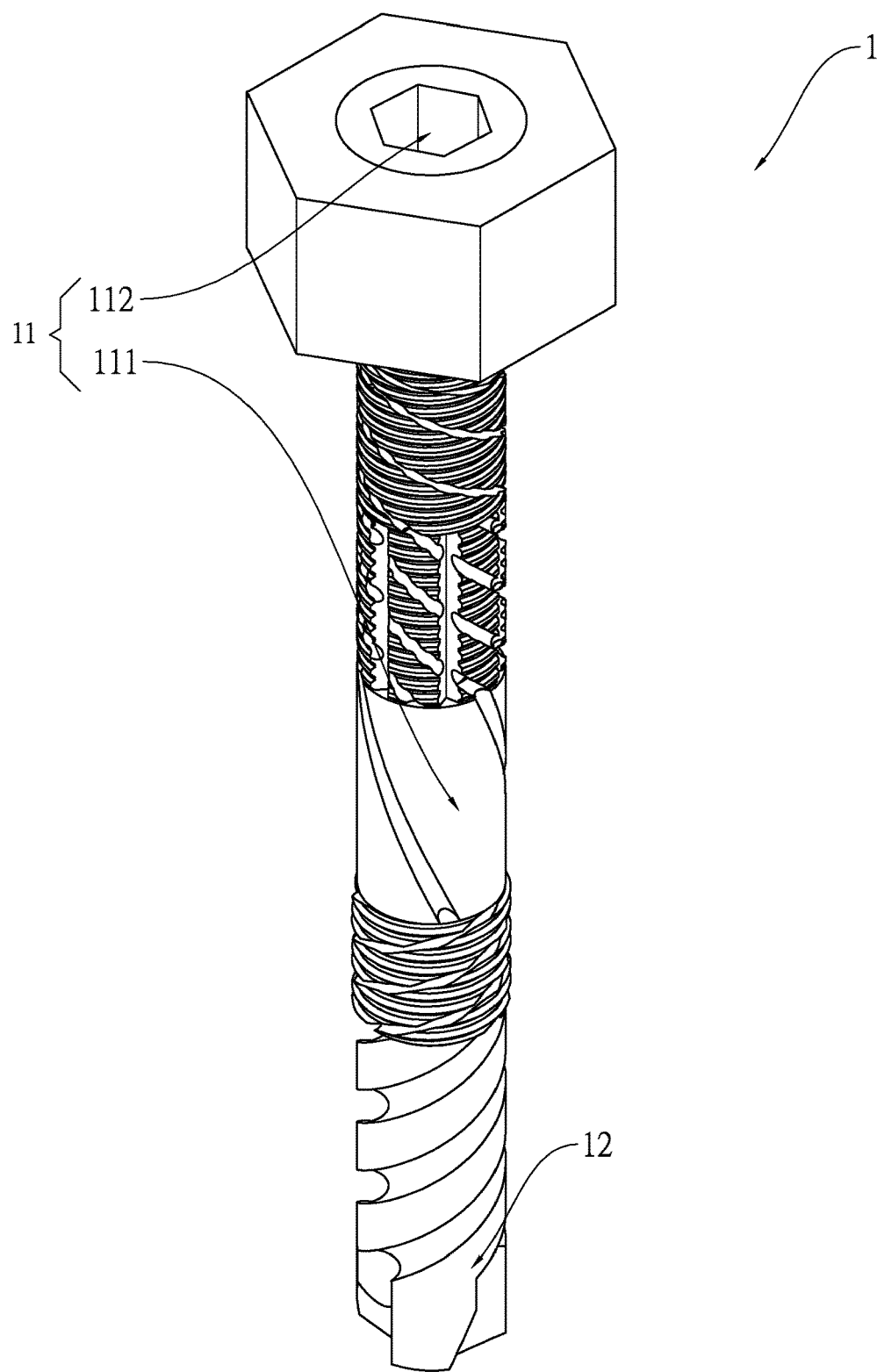
FIG. 1 is a perspective view of a multifunction drill bit according to a first preferred embodiment of the invention.

Referring to FIGS. 1 to 8, a multifunction drill bit 1 in accordance with a first preferred embodiment of the invention is shown. The multifunction drill bit 1 is for drilling metal workpieces and fastening same and comprises a shank 11 including an inner shank 112 and an outer shank 111; and a replaceable tip 12 for drilling a metal workpiece.

The outer shank 111 includes an outer lock head 1111, an outer shank body 1112 formed with the outer lock head 1111, and an axial hole 1113 through both the outer shank body 1112 and the outer lock head 1111. A plurality of spiral grooves 11121 are provided on the outer shank body 1112 for discharging chips. On the outer shank body 1112, there are sequentially provided a threaded section 11122 proximate the outer lock head 1112, a deformable section 11123 and a guide section 11124. Each of the threaded section 11122 and the deformable section 11123 include first external threads 111221. The deformable section 11123 has a plurality of linear grooves 111231 on an outer surface. A deformable concave surface 111232 is provided on an inner surface of the deformable section 11123. A plurality of first internal threads 111241 are provided on an inner surface of the guide section 11124. Moreover, a pitch of the spiral grooves 11121 is increased as a distance to the tip 12 increases. An inclined angle θ of the spiral grooves 11121 with respect to a horizontal line is defined as $$60°-5°\times(\text{thread height calculated from end of guide section/diameter of outer shank}).$$

The number of the spiral grooves 11121 is at least two times of the number of each of the threaded section 11122 and the guide section 11124.

The inner shank 112 is provided in the axial hole 1113. The inner shank 112 includes an inner lock head 1121 and an inner shank body 1122 formed with the inner lock head 1121. A plurality of second external threads 11221 are provided on an inner surface of the guide section 11124 adjacent to an end (i.e., distal the inner lock head 1121) corresponding to the first internal threads 111241. A socket 11211 is provided on a top of the inner lock head 1121.

Figure 5:
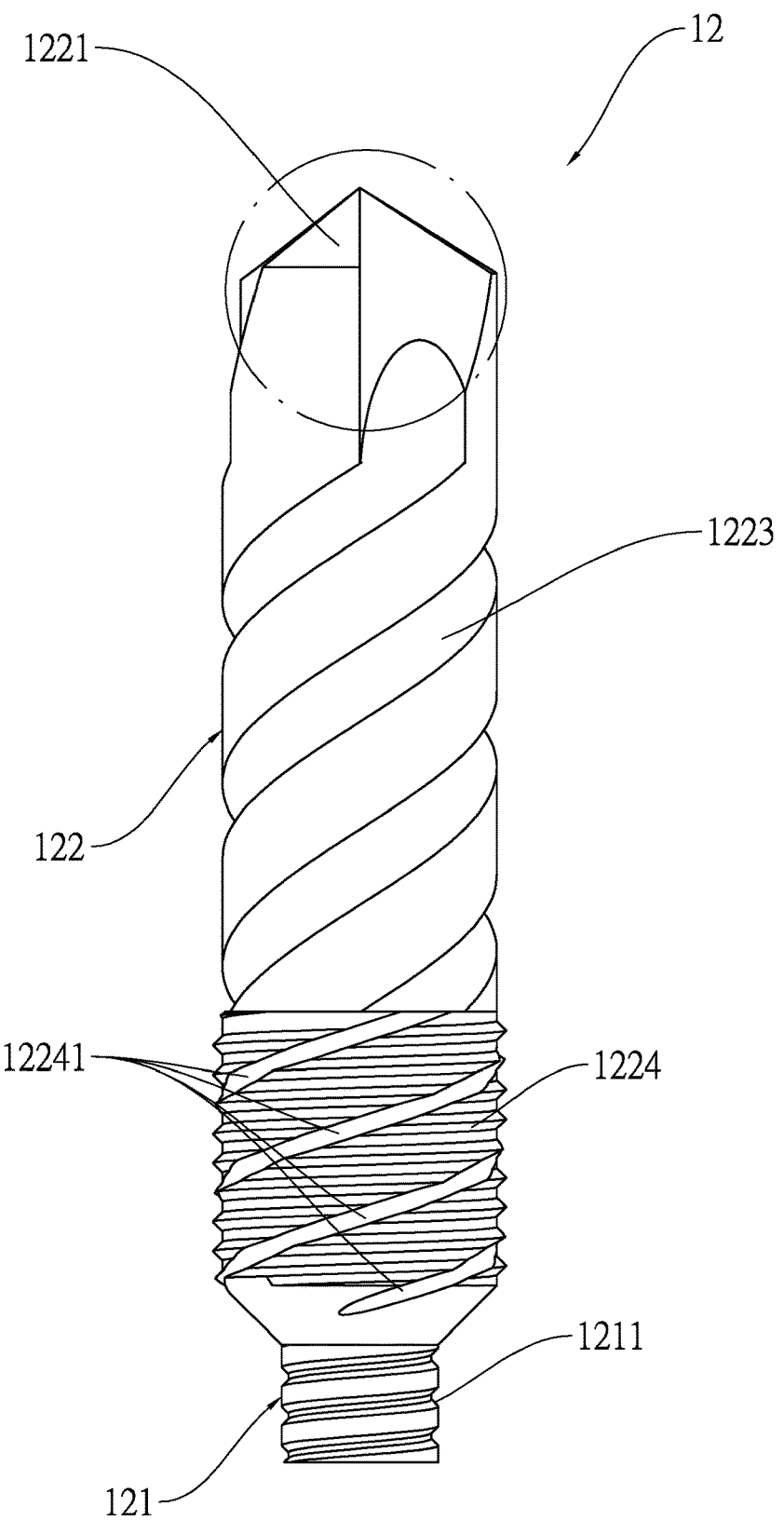
FIG. 5 is a side elevation of the replaceable tip.
Figure 6:
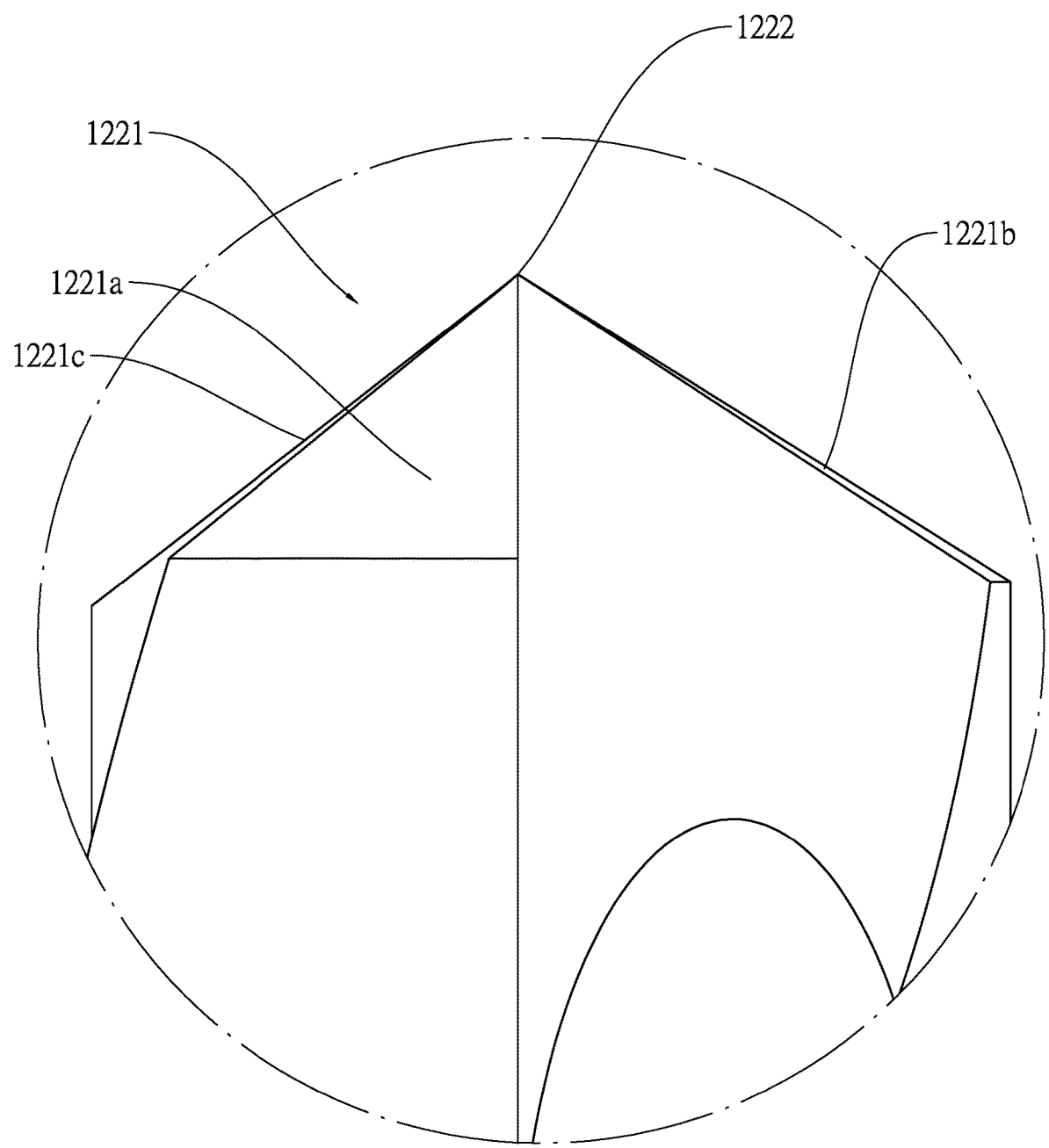
FIG. 6 is a detailed view of the arean in a circle of FIG. 5.

The tip 12 and the guide section 11124 are releasably secured together. The tip 12 includes a joining section 121 and a drilling section 122 formed with the joining section 121. A plurality of third external threads 1211 are provided on an outer surface of the joining section 121 corresponding to the first internal threads 111241. As shown in FIG. 5, the drilling section 122 includes, distal the joining section 121 and from top to bottom, a cutting surface 1221, a plurality of spirals 1223 and a plurality of threads 1224. As shown in FIG. 6, the cutting surface 1221 includes a first cutting face 1221a, a second cutting face 1221b and a third cutting face 1221c. Angles of the first cutting face 1221a, the second cutting face 1221b and the third cutting face 1221c with respect to an end 1222 of the tip 12 are different and are increased counterclockwise. Specifically, the angle of the first cutting face 1221a with respect to the end 1222 is 30-degree, the angle of the second cutting face 1221b with respect to the end 1222 is 30.1 to 31-degree, and the angle of the third cutting face 1221c with respect to the end 1222 is 31.1 to 32-degree. A plurality of spiral grooves 12241 are provided on the threads 1224 for discharging chips.

Figure 3:
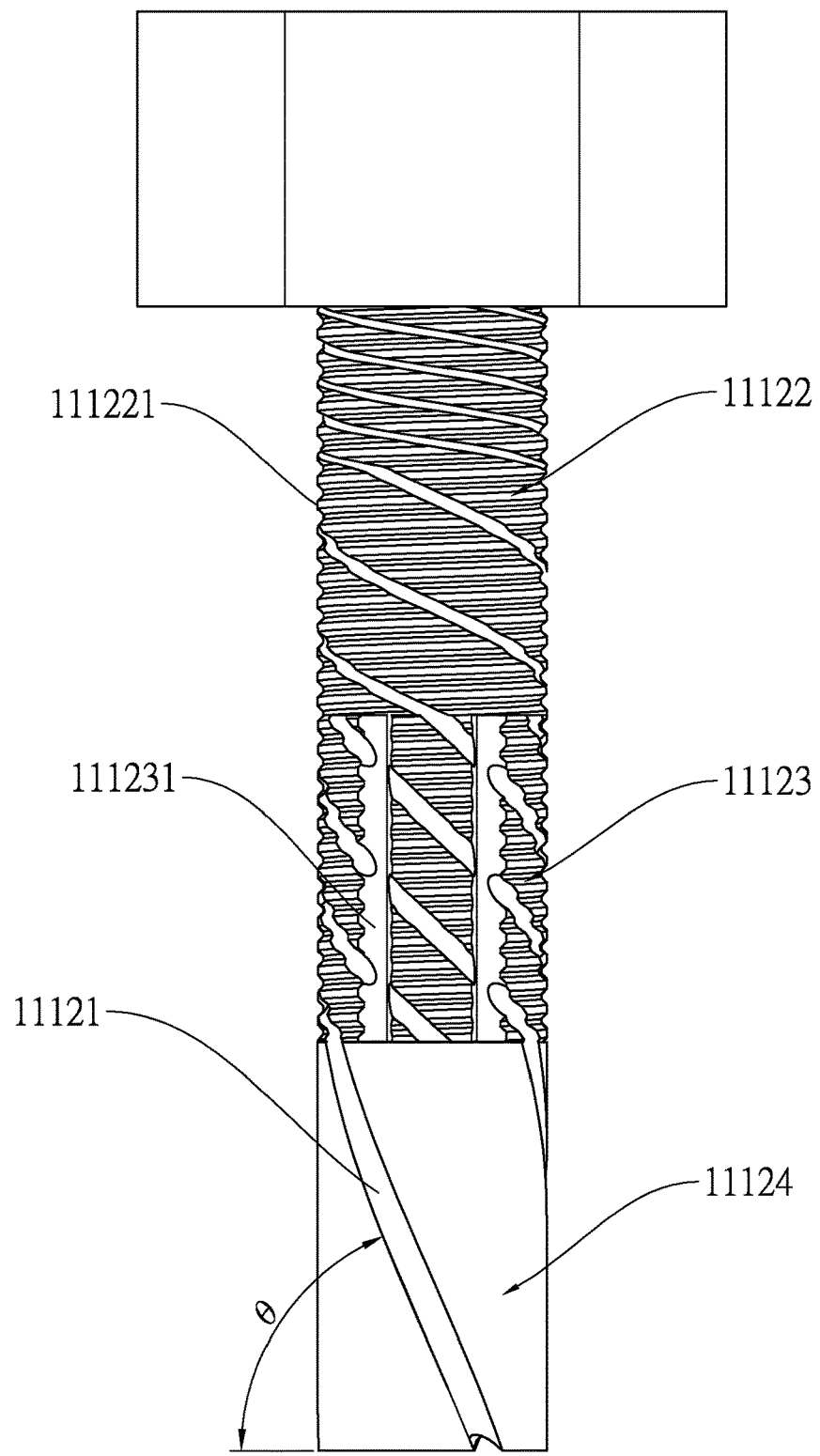
FIG. 3 is a side elevation of the outer shank.
Figure 4:
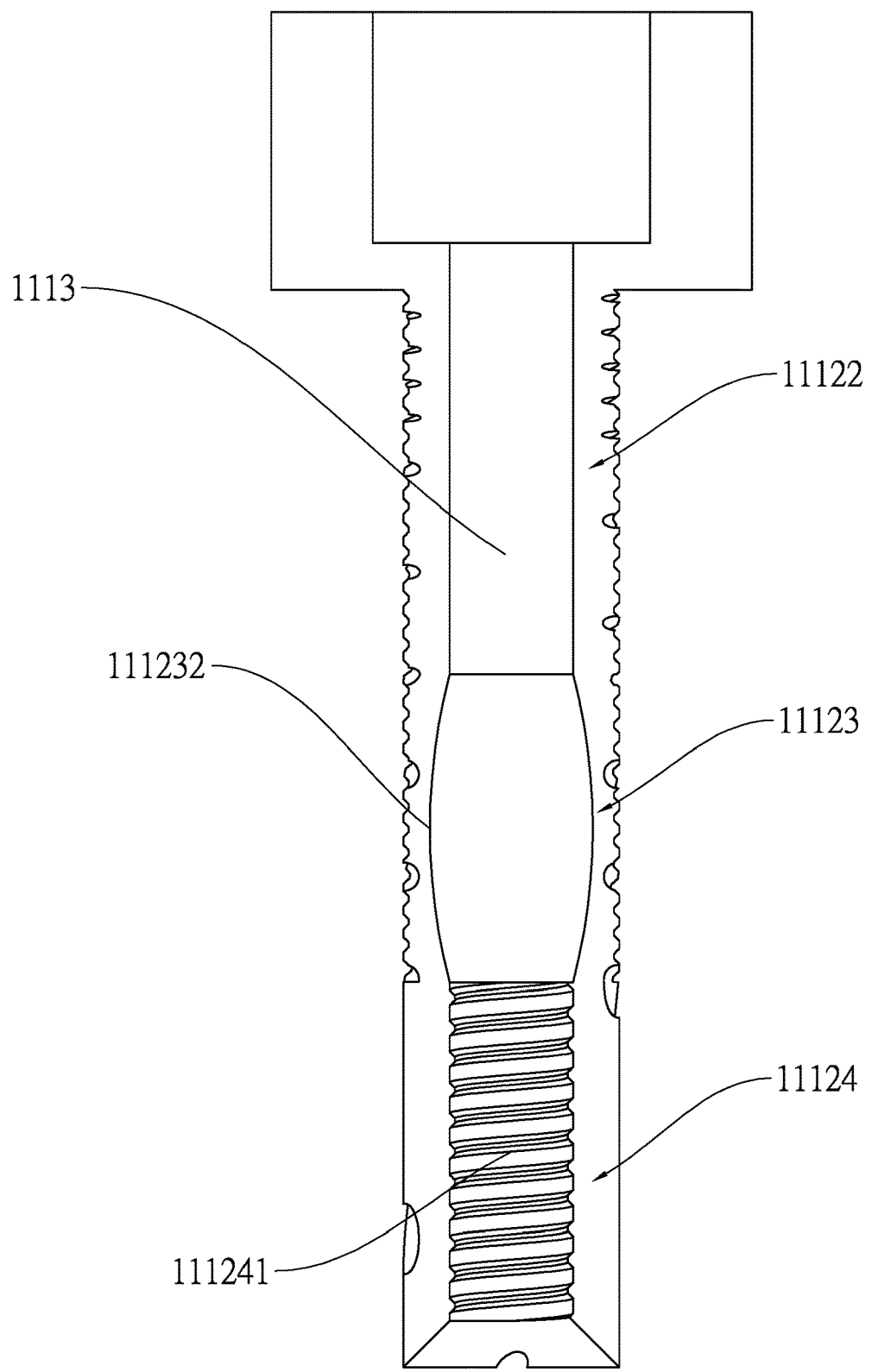
FIG. 4 is a longitudinal sectional view of the outer shank.
Figure 7:
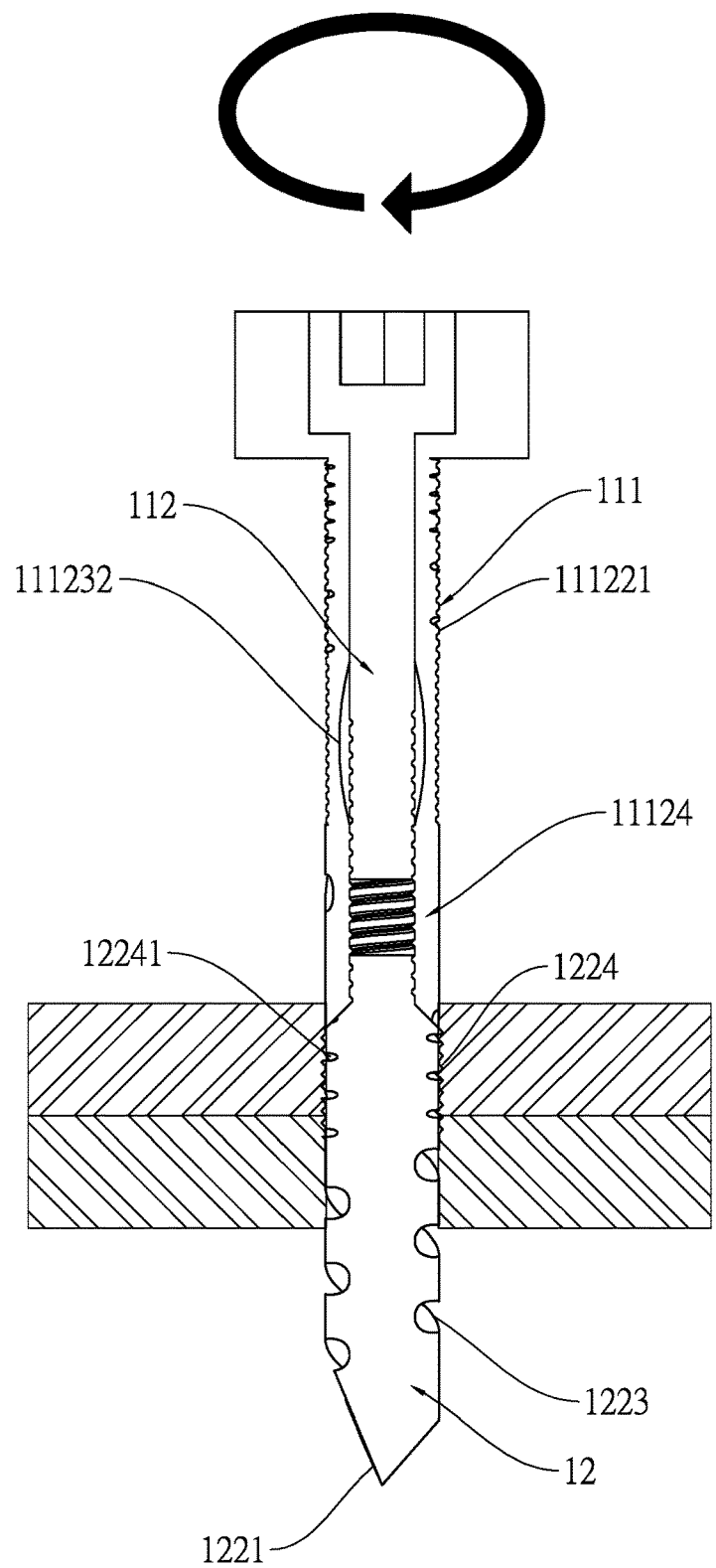
FIG. 7 is a longitudinal sectional view showing the multifunction drill bit being driven through two metal workpieces.
Figure 8:
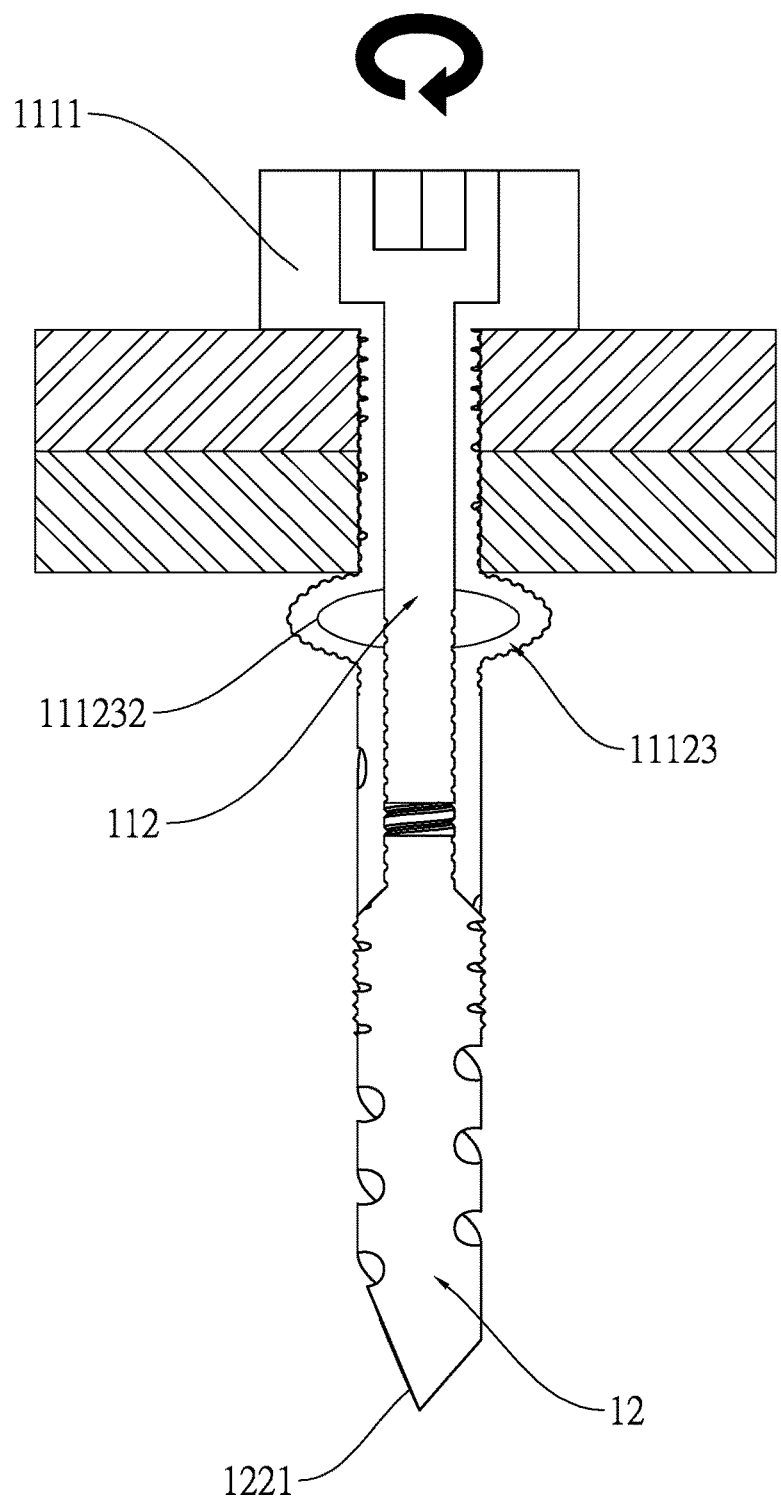
FIG. 8 is a view similar to FIG. 7 showing the workpieces being fastened together by the multifunction drill bit at the end of the drilling and fastening operation.
Figure 9:
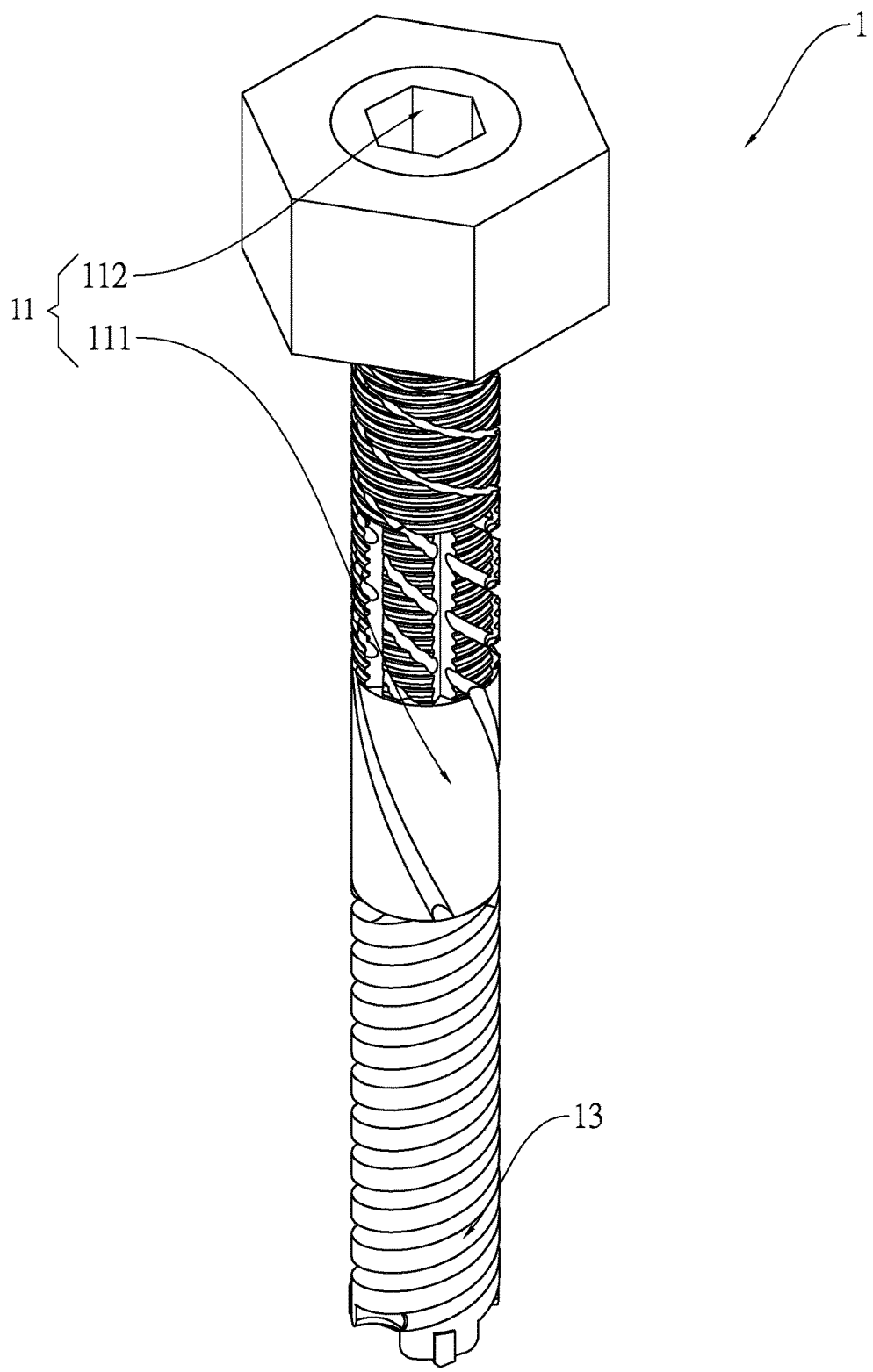
FIG. 9 is a perspective view of a multifunction drill bit according to a second preferred embodiment of the invention.
Figure 10:
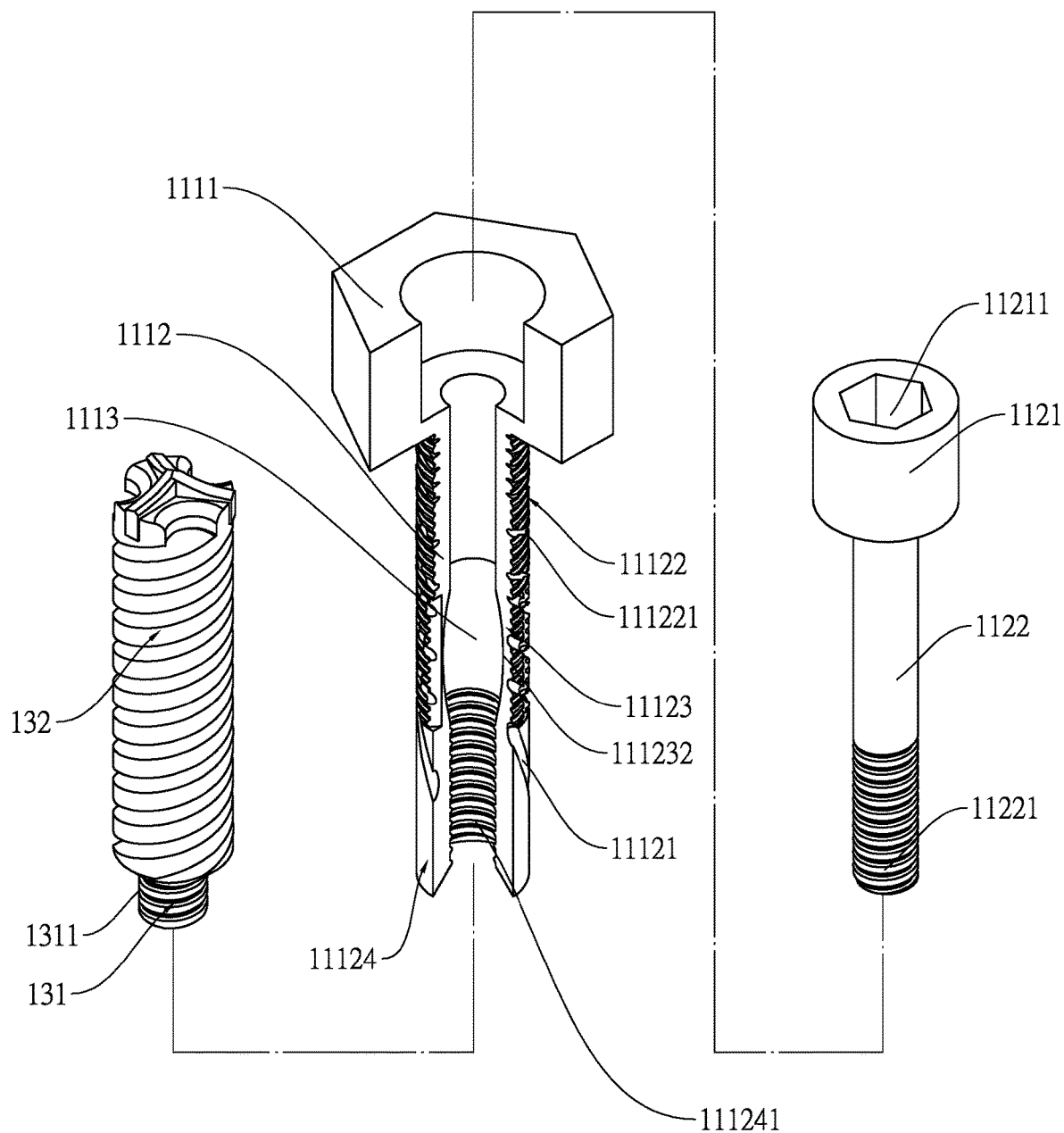
FIG. 10 is an exploded view of the multifunction drill bit of FIG. 9.

Referring to FIGS. 7 and 8 specifically in conjunction with FIGS. 3 and 4, the drill bit of the first preferred embodiment of the invention is for a hand-held electric drill to drill two metal workpieces and fasten same. Firstly, a drilling and fastening operation begins with the first cutting face 1221a having the smallest angle, the second cutting face 1221b having the angle greater than the angle of the first cutting face 1221a, and the third cutting face 1221c having the greatest angle sequentially. The three different angles arrangement of the cutting surface 1221 aims at preventing the drill bit from drilling a metal workpiece at an acute angle prior to drilling same at a perpendicular angle. After the cutting surface 1221 has entered the metal workpiece, the spirals 1223 are driven to drill a hole having the bore substantially the same as that of the tip 12. Next, the threads 1224 are driven to form threads on a surface of the hole and chips are discharged via the spiral grooves 12241. After the tip 12 has completely entered the metal workpiece, the guide section 11124 guides the outer shank 111 into the hole. Next, the chips are discharged via the spiral grooves 11121. After the outer shank 111 has entered the hole by a depth and the first external threads 111221 contact the metal workpiece, the first external threads 111221 drive into the threads drilled by the threads 1224. After the outer shank 111 has been driven to a maximum depth with the outer lock head 1111 engaged a surface of the upper metal workpiece and the tip 12 completely passed through the lower metal workpiece, the inner shank 112 is fastened. Finally, in response to rotating the inner shank 112, the guide section 11124 moves upward to continuously press the deformable section 11123. Advantageously, the curved grooves 111231 and the deformable concave surface 111232 can decrease the structural strength of the deformable section 11123, thereby deforming the deformable section 11123. After the inner shank 112 has been driven into the hole for a preset depth, the deformed deformable section 11123 is jammed at a bottom of the lower metal workpiece. As a result, the multifunction drill bit 1 is fastened in the metal workpieces.

Referring to FIGS. 9 to 14 in conjunction with FIGS. 3 and 4, a multifunction drill bit 1 of a second preferred embodiment of the invention is shown. The second preferred embodiment is for a hand-held electric drill to drill concrete and fasten the drill bit in the concrete. The multifunction drill bit 1 comprises a shank 11 including an inner shank 112 and an outer shank 111; and a replaceable tip 13.

Similar to that shown in FIGS. 3 and 4, the outer shank 111 includes an outer lock head 1111, an outer shank body 1112 formed with the outer lock head 1111, and an axial hole 1113 through both the outer shank body 1112 and the outer lock head 1111. A plurality of spiral grooves 11121 are provided on the outer shank body 1112 for discharging chips. From a joining portion of the outer shank body 1112 and the outer lock head 1111 to the outer lock head 1111, there are sequentially provided a threaded section 11122, a deformable section 11123 and a guide section 11124. Each of the threaded section 11122 and the deformable section 11123 include first external threads 111221. The deformable section 11123 has a plurality of curved grooves 111231 on an outer surface. A deformable concave surface 111232 is provided on an inner surface of the deformable section 11123. A plurality of first internal threads 111241 are provided on an inner surface of the guide section 11124. Moreover, a pitch of the spiral grooves 11121 is increased as a distance to the tip 13 increases. An inclined angle θ of the spiral grooves 11121 with respect to a horizontal line is defined as 60°−5°×(thread height calculated from end of guide section/diameter of outer shank).

The number of the spiral grooves 11121 is at least two times of the number of each of the threaded section 11122 and the guide section 11124.

The inner shank 112 is provided in the axial hole 1113. The inner shank 112 includes an inner lock head 1121 and an inner shank body 1122 formed with the inner lock head 1121. A plurality of second external threads 11221 are provided on an inner surface of the guide section 11124 adjacent to an end (i.e., distal the inner lock head 1121) corresponding to the first internal threads 111241. A socket 11211 is provided on a top of the inner lock head 1121.

Figure 11:
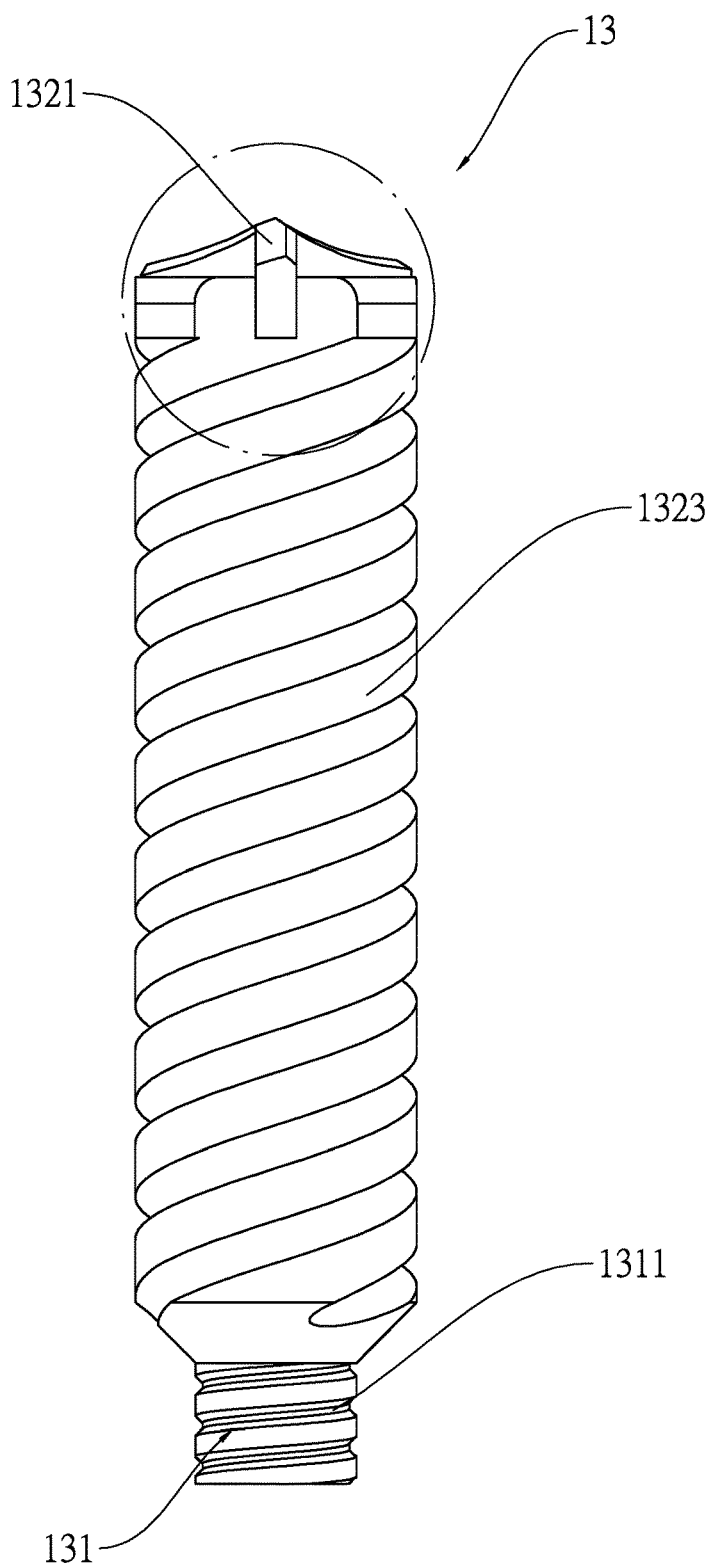
FIG. 11 is a side elevation of the replaceable tip.
Figure 12:
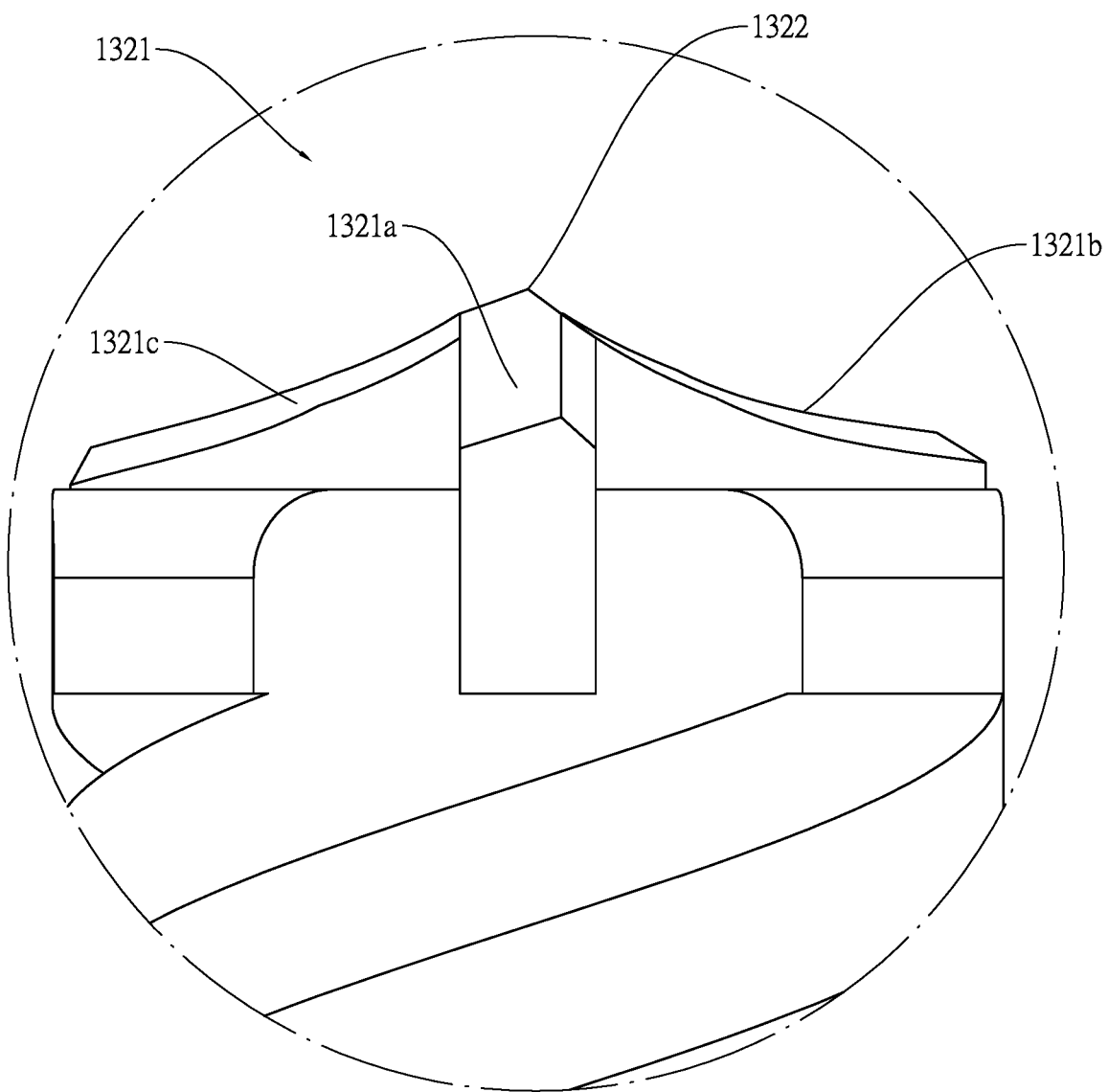
FIG. 12 is a detailed view of the arean in a circle of FIG. 11.

The tip 13 and the guide section 11124 are releasably secured together. The tip 13 includes a joining section 131 and a drilling section 132 formed with the joining section 131. A plurality of third external threads 1311 are provided on an outer surface of the joining section 131 corresponding to the first internal threads 111241. As shown in FIG. 11, the drilling section 132 includes, distal the joining section 131 and from top to bottom, a cutting surface 1321, a plurality of spirals 1323 and a plurality of threads 1324. As shown in FIG. 12, the cutting surface 1321 includes a first cutting face 1321a, a second cutting face 1321b and a third cutting face 1321c. Angles of the first cutting face 1321a, the second cutting face 1321b and the third cutting face 1321c with respect to an end 1322 of the tip 13 are different and are increased counterclockwise. Specifically, the angle of the first cutting face 1321a with respect to the end 1322 is 30-degree, the angle of the second cutting face 1321b with respect to the end 1322 is 30.1 to 31-degree, and the angle of the third cutting face 1321c with respect to the end 1322 is 31.1 to 32-degree.

Figure 13:
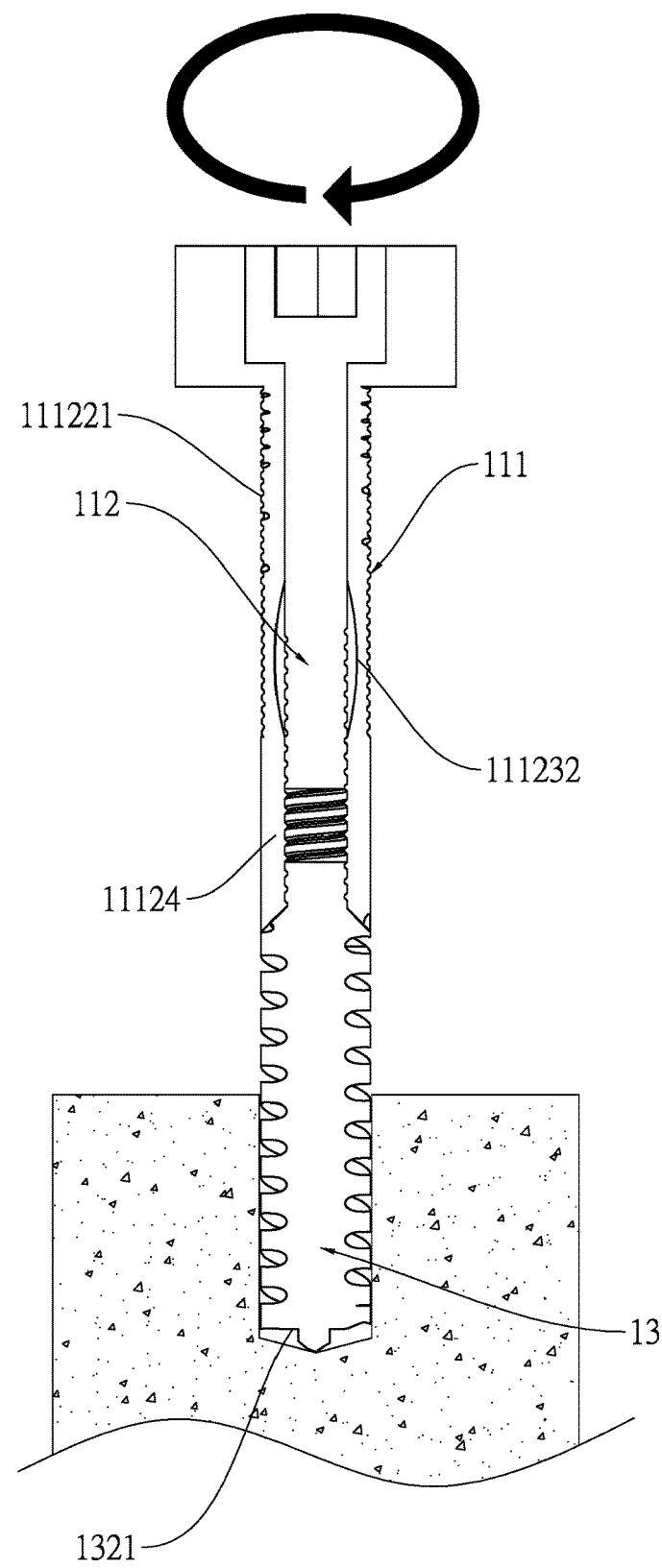
FIG. 13 is a longitudinal sectional view showing the multifunction drill bit being driven into concrete.
Figure 14:
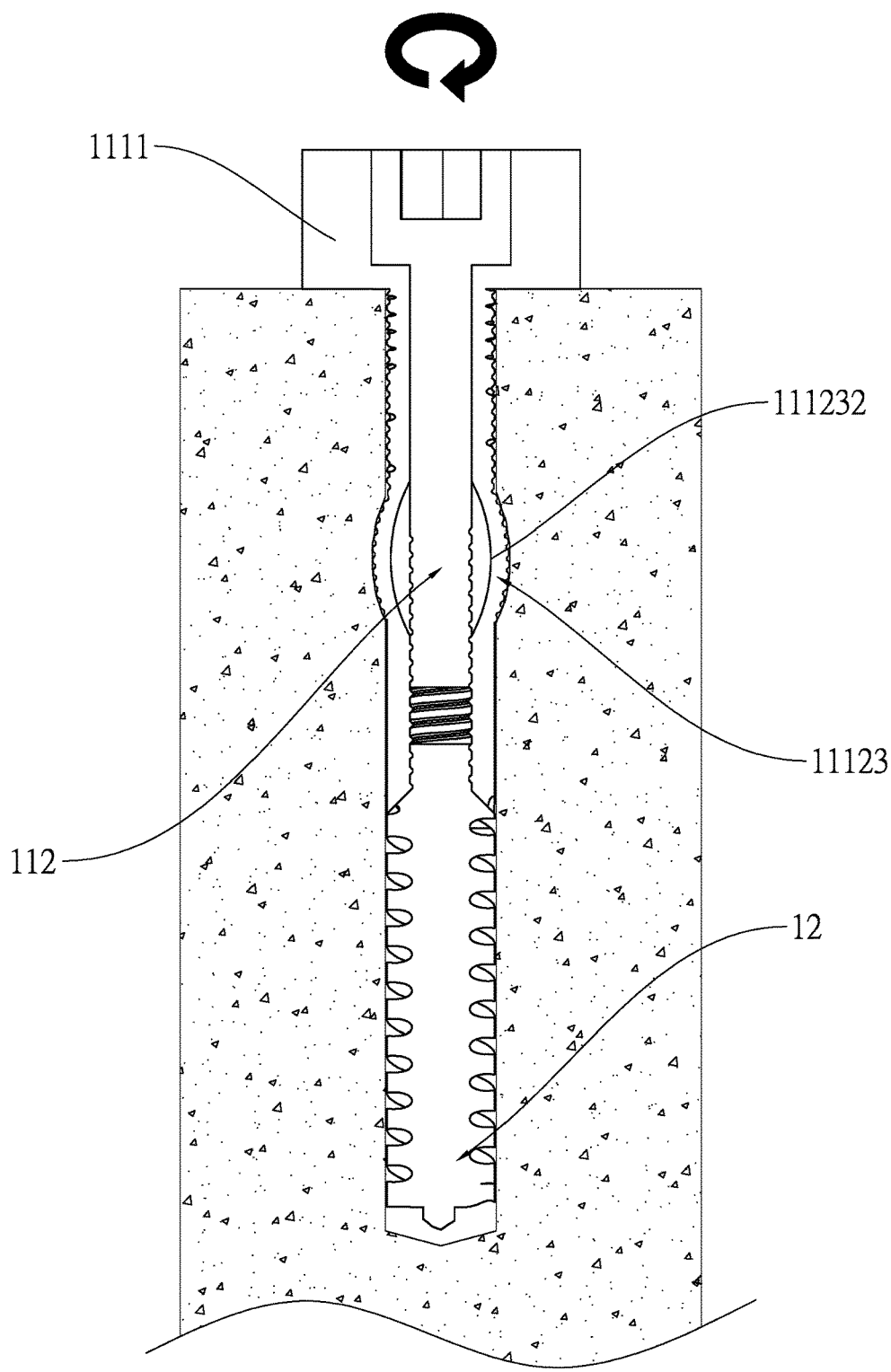
FIG. 14 is a view similar to FIG. 13 showing the multifunction drill bit being fastened in the concrete at the end of the drilling and fastening operation.

As shown in FIGS. 13 and 14 specifically, the drill bit of the second preferred embodiment of the invention is shown. The second preferred embodiment is for a hand-held electric drill to drill concrete and fasten the drill bit in the concrete. Firstly, a drilling and fastening operation begins with the first cutting face 1321a having the smallest angle, the second cutting face 1321b having the angle greater than the angle of the first cutting face 1321a, and the third cutting face 1321c having the greatest angle sequentially. The three different angles arrangement of the cutting surface 1321 aims at preventing the drill bit from drilling concrete at an acute angle prior to drilling same at a perpendicular angle. After the cutting surface 1321 has entered the concrete workpiece, the spirals 1323 are driven to drill a hole having the bore substantially the same as that of the tip 13. Next, the threads 1324 are driven to form threads on a surface of the hole and chips are discharged via the spiral grooves 13241. After the tip 13 has completely entered the concrete workpiece, the guide section 11124 guides the outer shank 111 into the hole. Next, the chips are discharged via the spiral grooves 11121. After the outer shank 111 has entered the hole by a depth and the first external threads 111221 contact the concrete workpiece, the first external threads 111221 drive into the threads drilled by the threads 1324. After the outer shank 111 has been driven to a maximum depth with the outer lock head 1111 engaged a surface of the upper concrete workpiece and the tip 13 completely passed through the lower concrete workpiece, the inner shank 112 is fastened. Finally, in response to rotating the inner shank 112, the guide section 11124 moves upward to continuously press the deformable section 11123. Advantageously, the curved grooves 111231 and the deformable concave surface 111232 can decrease the structural strength of the deformable section 11123, thereby deforming the deformable section 11123. After the inner shank 112 has been driven into the hole for a preset depth, the deformed deformable section 11123 is jammed in the hole of the concrete workpiece. As a result, the multifunction drill bit 1 is fastened in the concrete workpiece.

Figure 15:
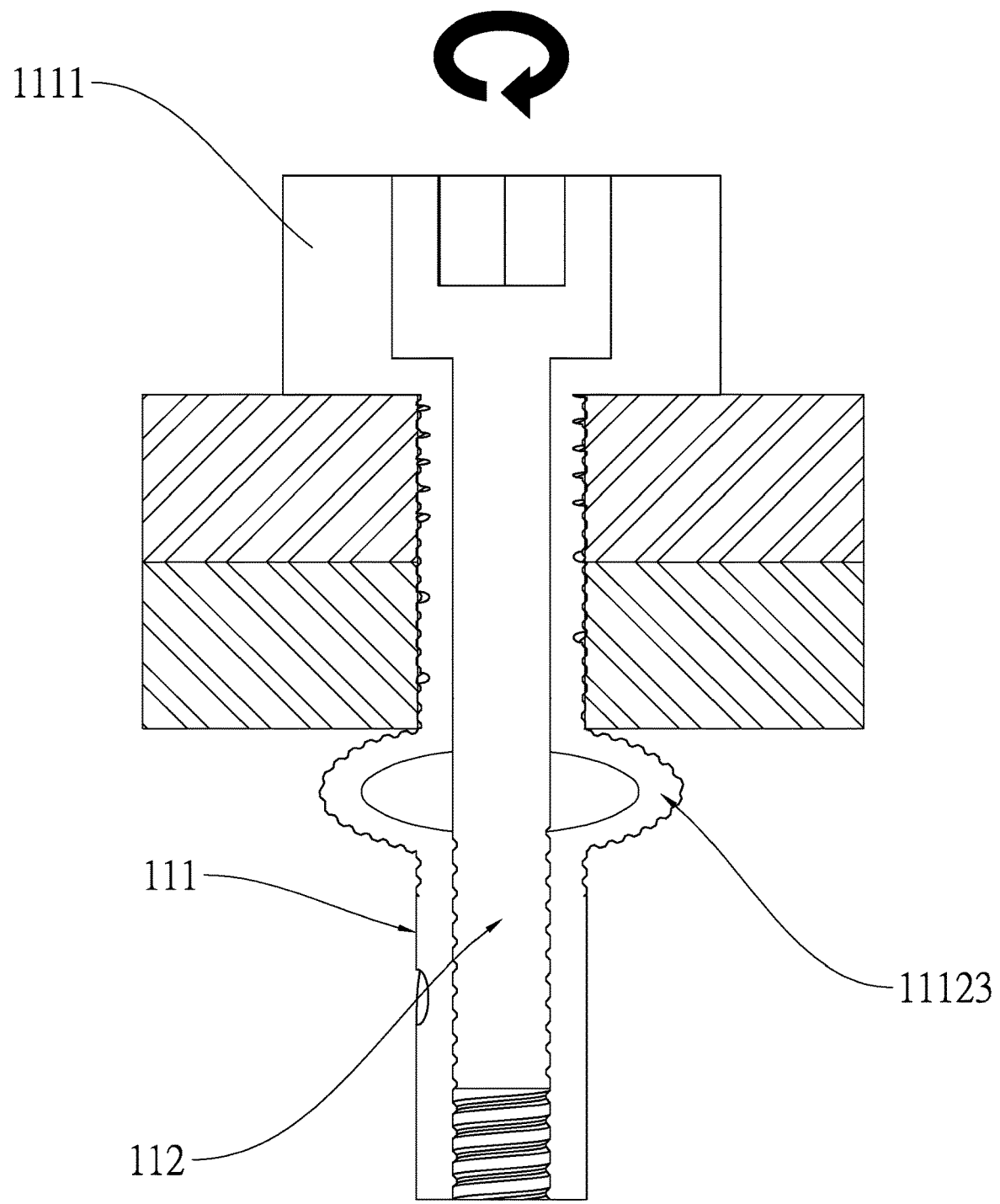
FIG. 15 is a longitudinal sectional view showing two workpieces being fastened together by a multifunction drill bit according to a third preferred embodiment of the invention at the end of the drilling and fastening operation.
Figure 16:
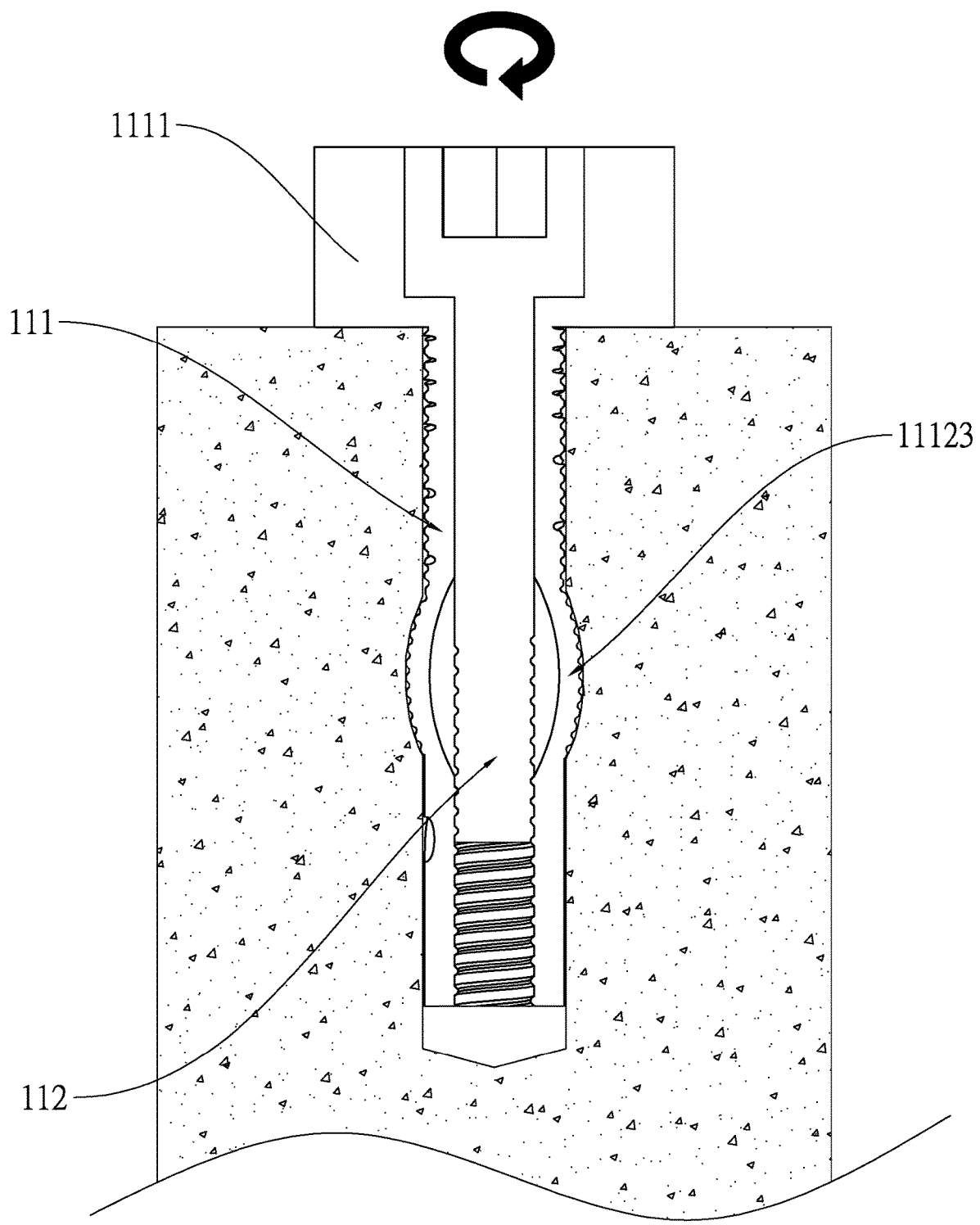
FIG. 16 is a longitudinal sectional view showing the multifunction drill bit being fastened in the concrete at the end of the drilling and fastening operation.
Figure 17:
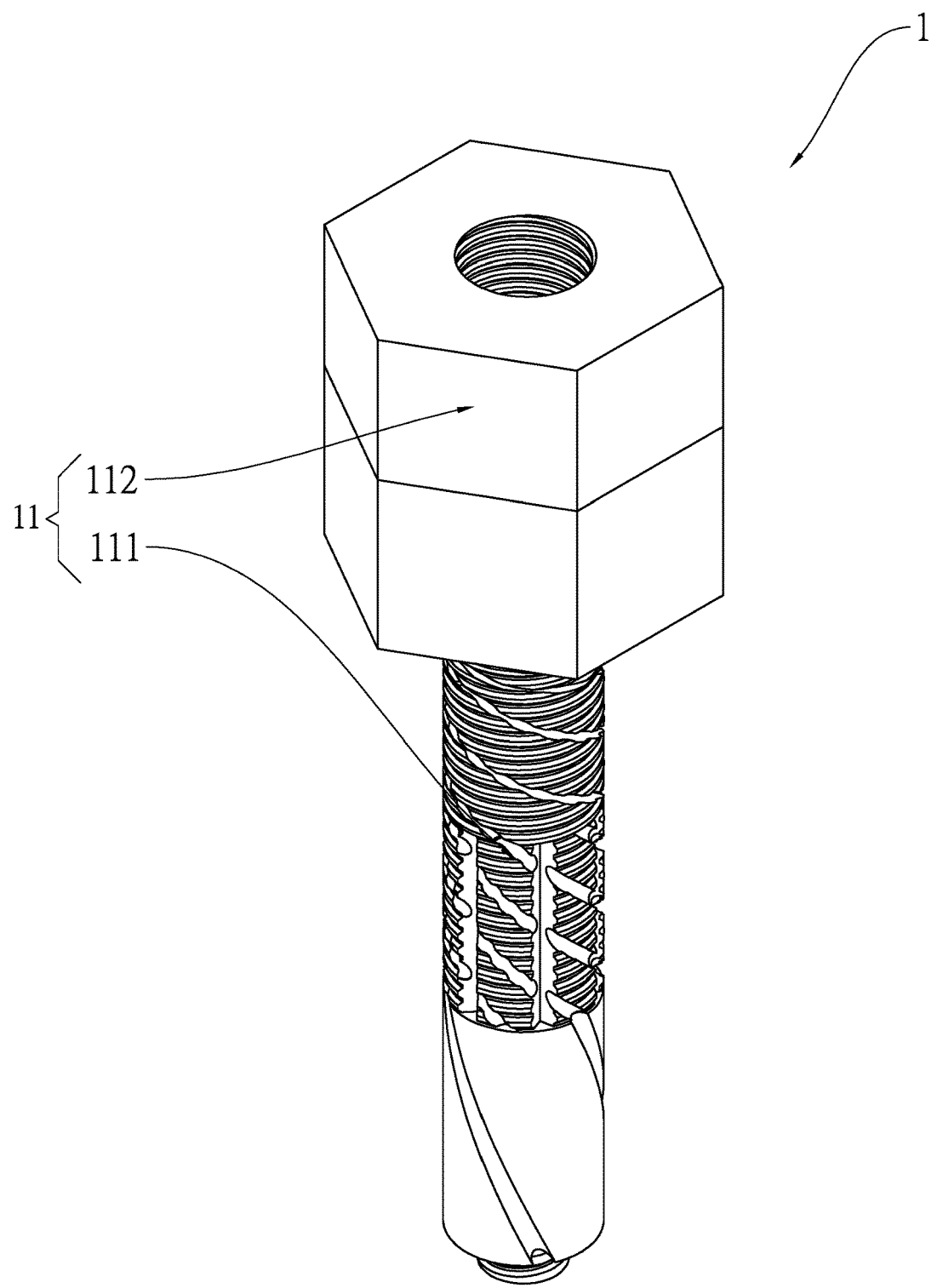
FIG. 17 is a perspective view of a multifunction drill bit according to a fourth preferred embodiment of the invention.
Figure 18:
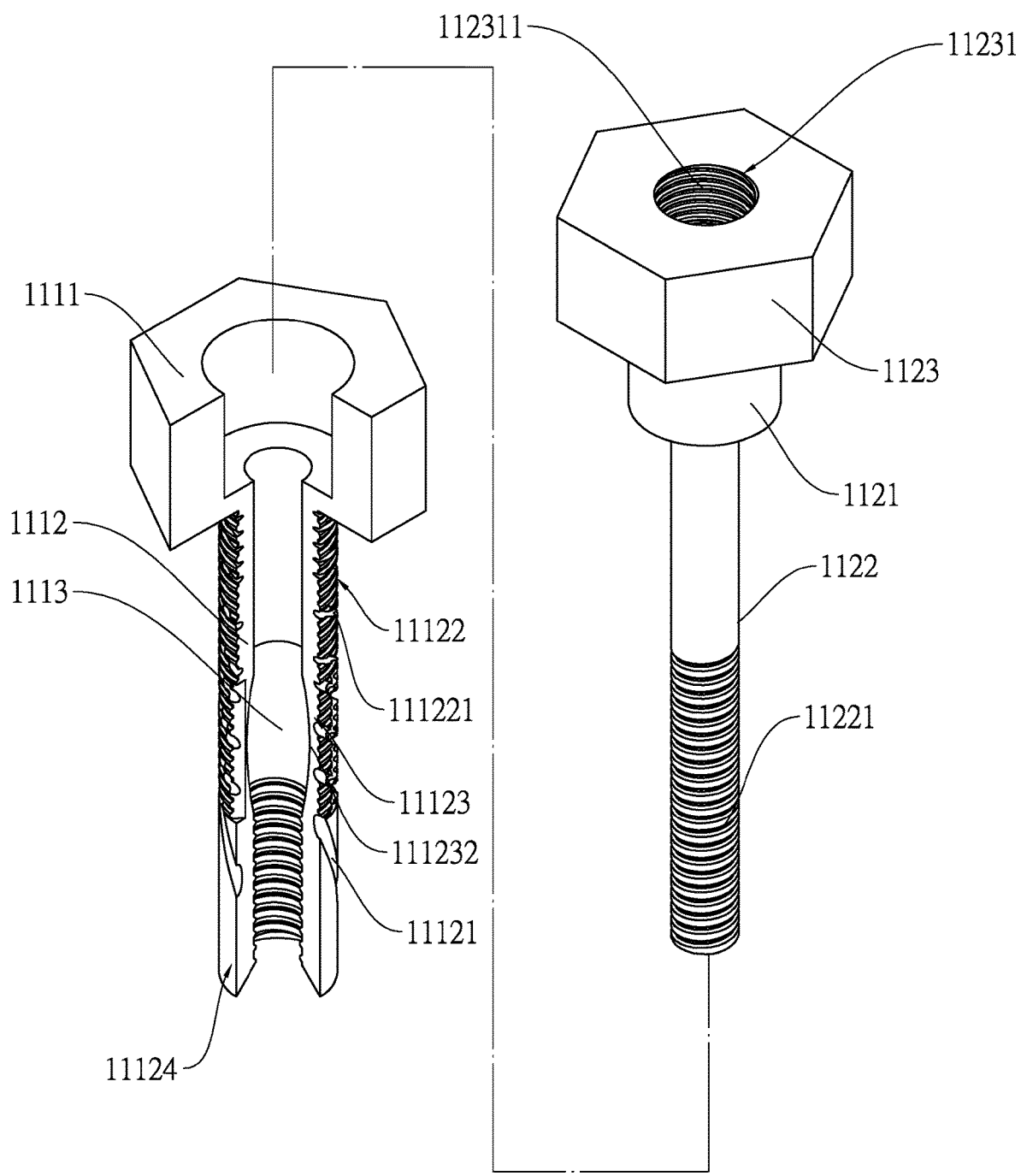
FIG. 18 is an exploded view of the multifunction drill bit of FIG. 17.
Figure 19:
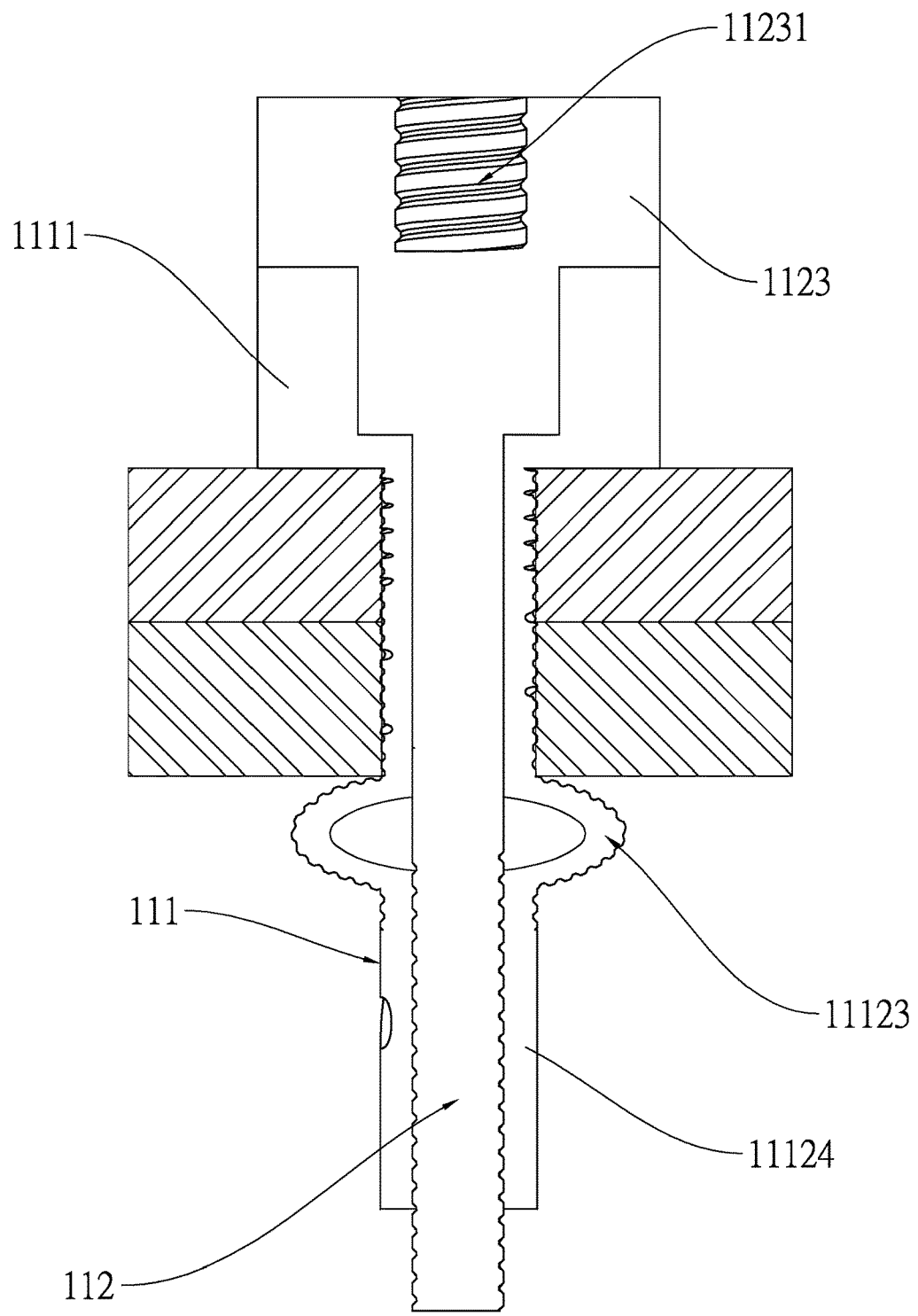
FIG. 19 is a longitudinal sectional view showing two workpieces being fastened together by the multifunction drill bit of FIG. 17 at the end of the drilling and fastening operation.
Figure 20:
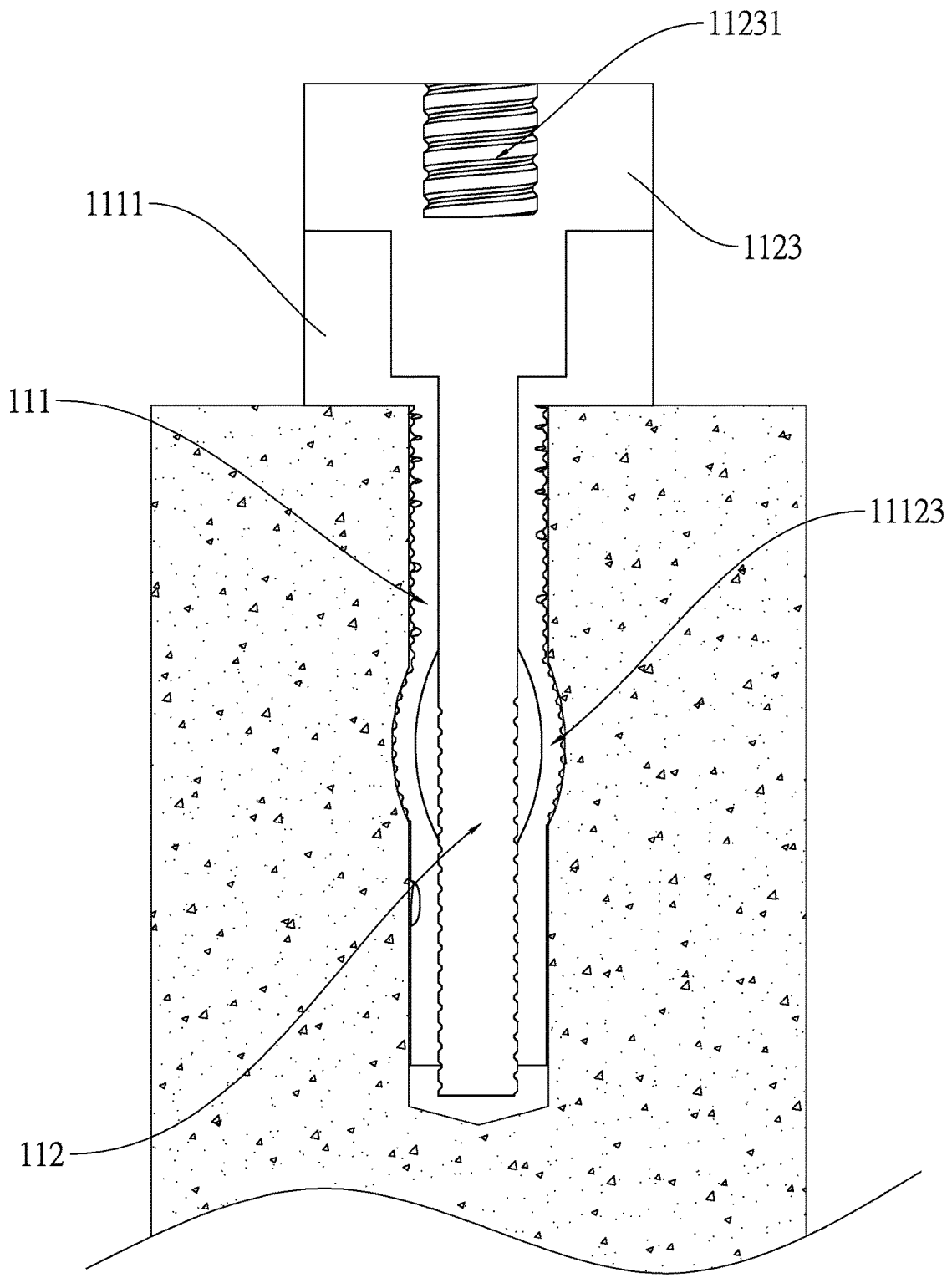
FIG. 20 is a longitudinal sectional view showing the multifunction drill bit of FIG. 17 being fastened in the concrete at the end of the drilling and fastening operation.
Figure 21:
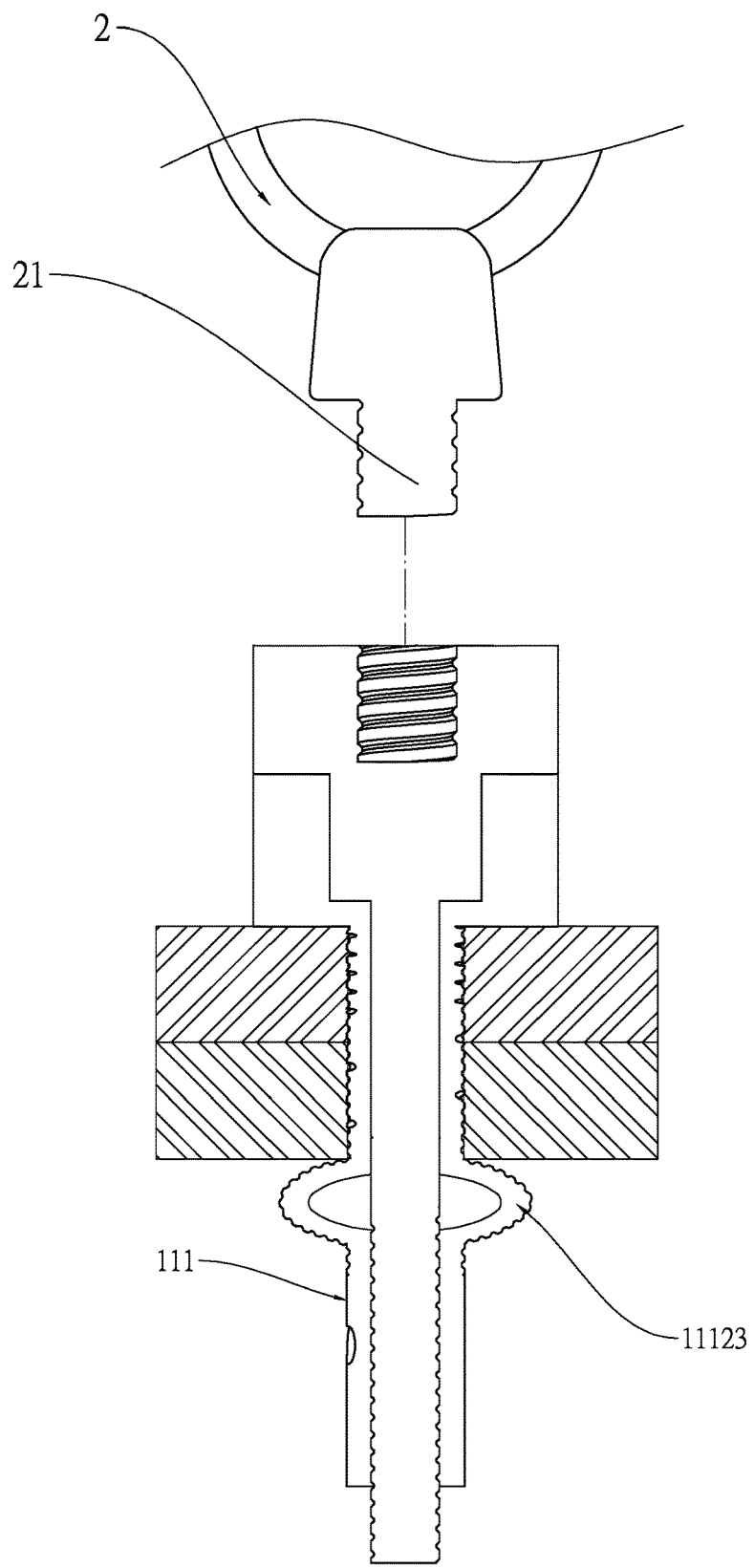
FIG. 21 is a view similar to FIG. 19 showing another configuration of the multifunction drill bit of FIG. 17.
Figure 22:
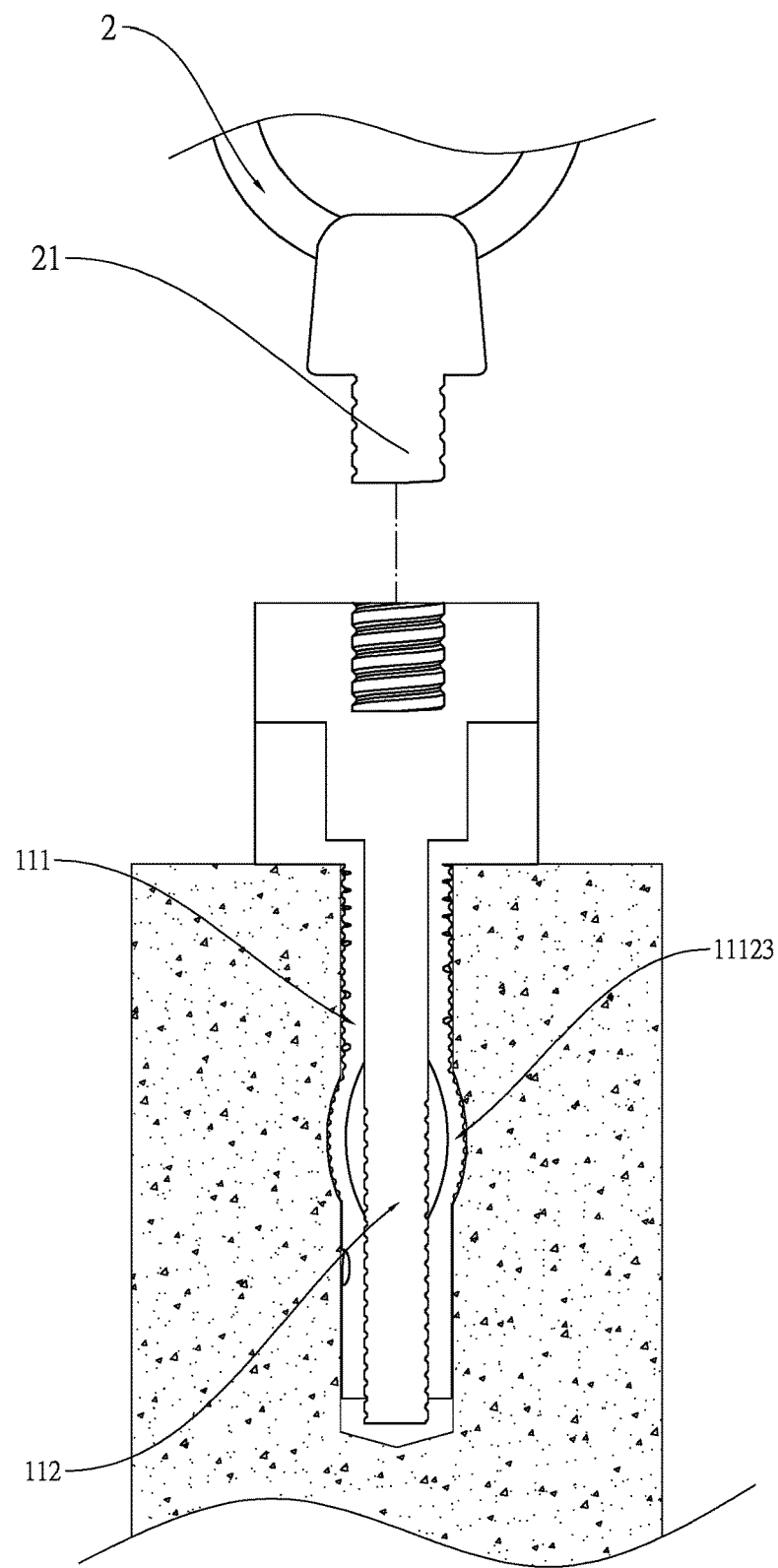
FIG. 22 is a view similar to FIG. 20 showing yet another configuration of the multifunction drill bit of FIG. 17.
Figure 23:
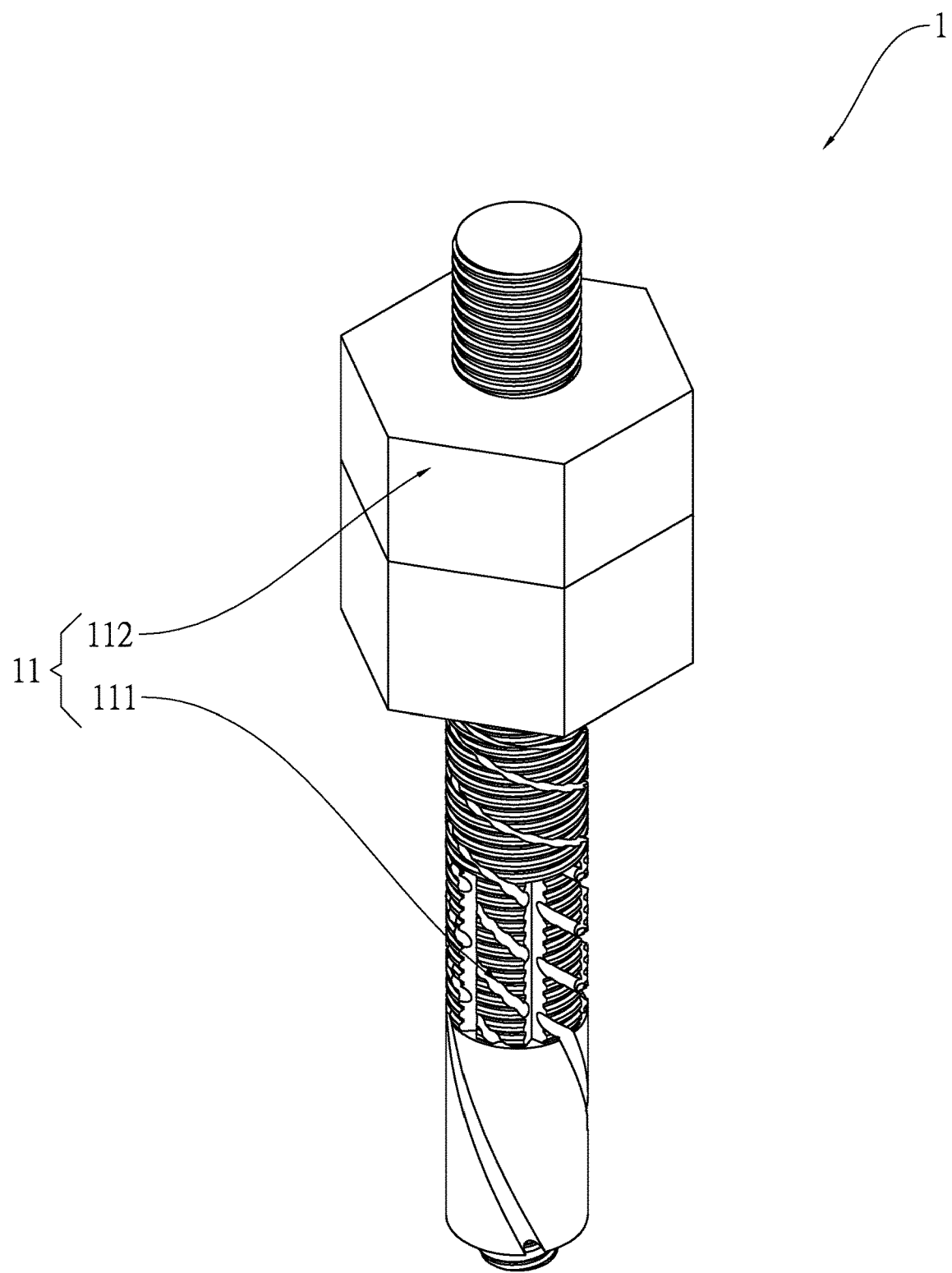
FIG. 23 is a perspective view of a multifunction drill bit according to a fifth preferred embodiment of the invention.
Figure 24:
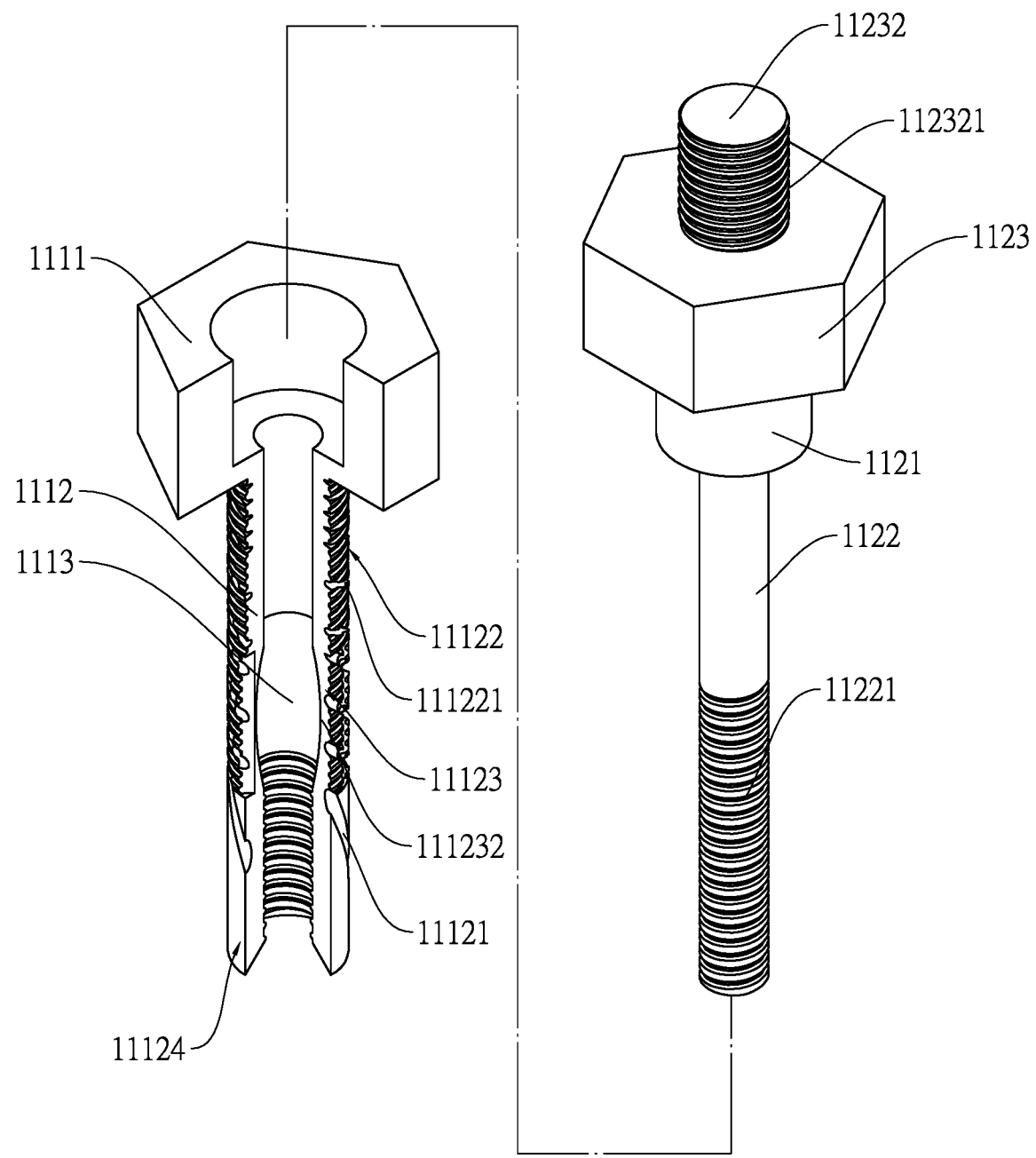
FIG. 24 is an exploded view of the multifunction drill bit of FIG. 23.
Figure 25:
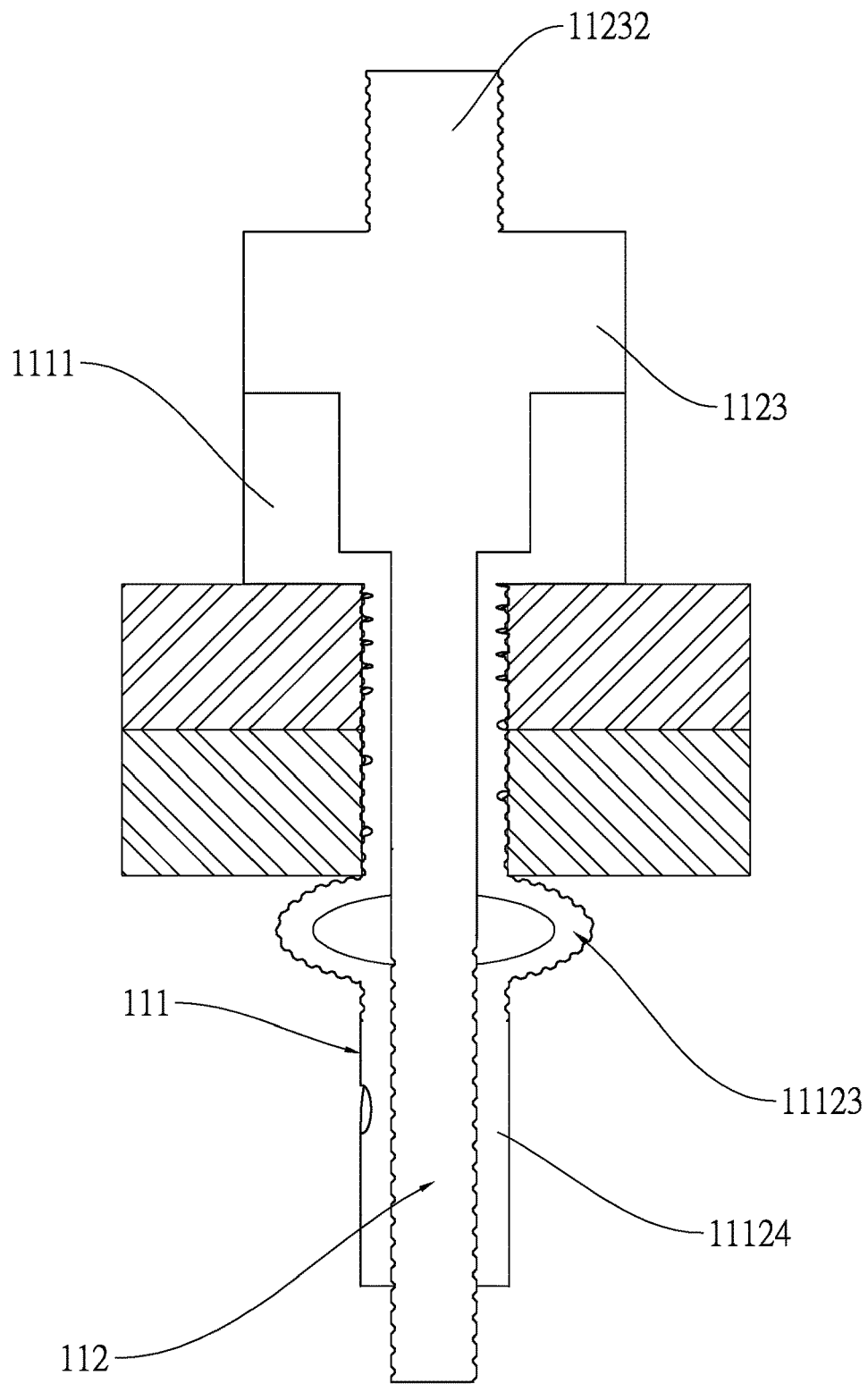
FIG. 25 is a longitudinal sectional view showing two workpieces being fastened together by the multifunction drill bit of FIG. 23 at the end of the drilling and fastening operation.
Figure 26:
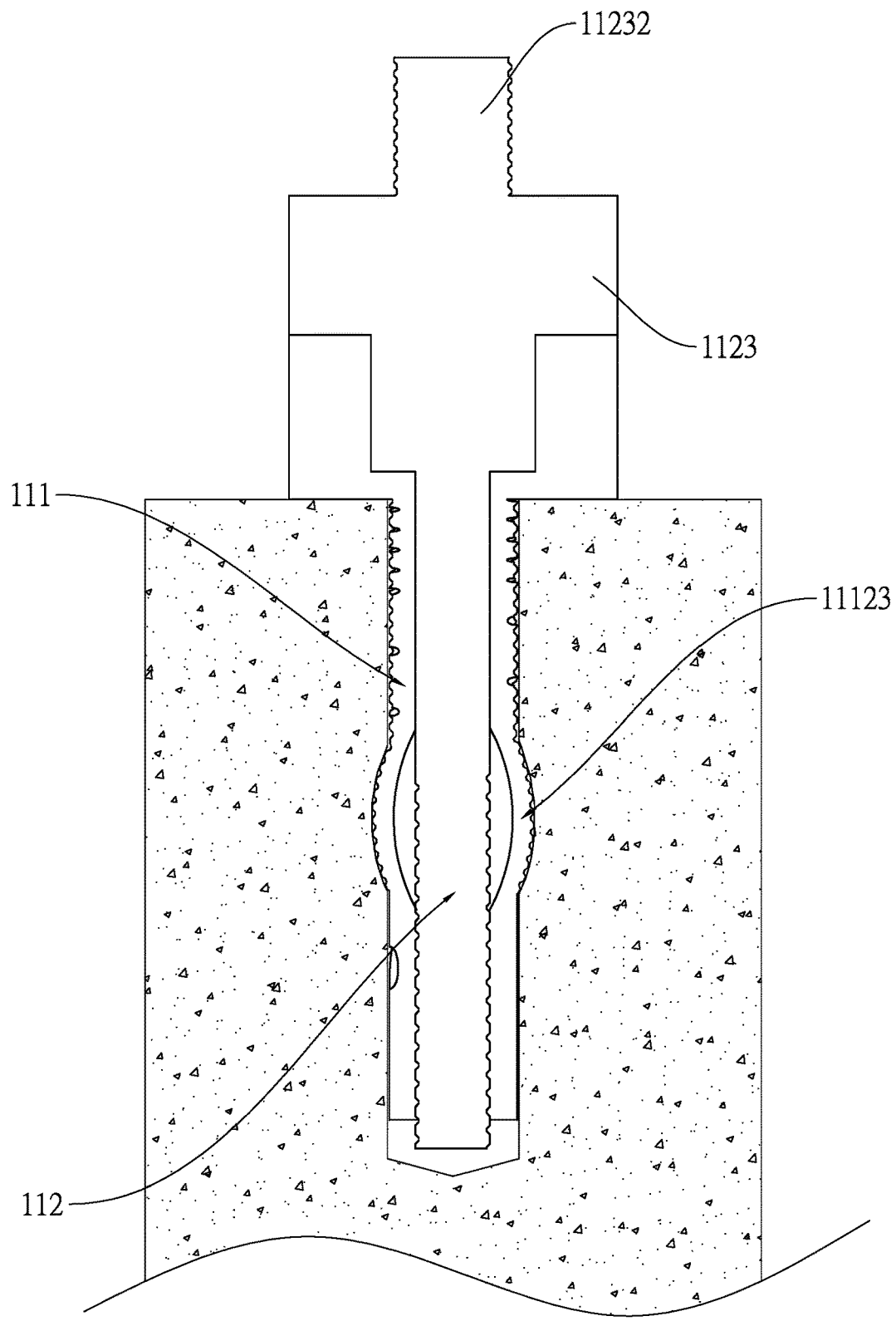
FIG. 26 is a longitudinal sectional view showing the multifunction drill bit of FIG. 23 being fastened in the concrete at the end of the drilling and fastening operation.
Figure 27:
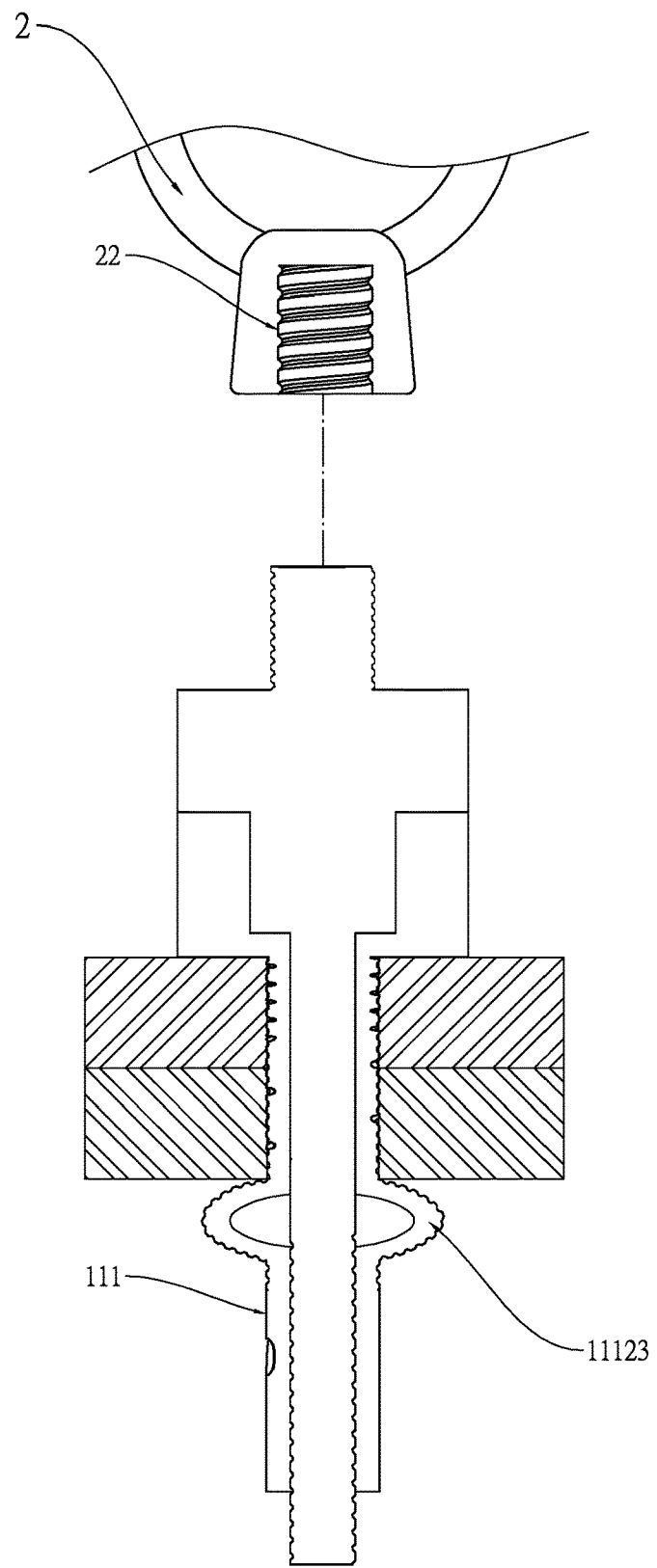
FIG. 27 is a view similar to FIG. 25 showing another configuration of the multifunction drill bit of FIG. 23.
Figure 28:
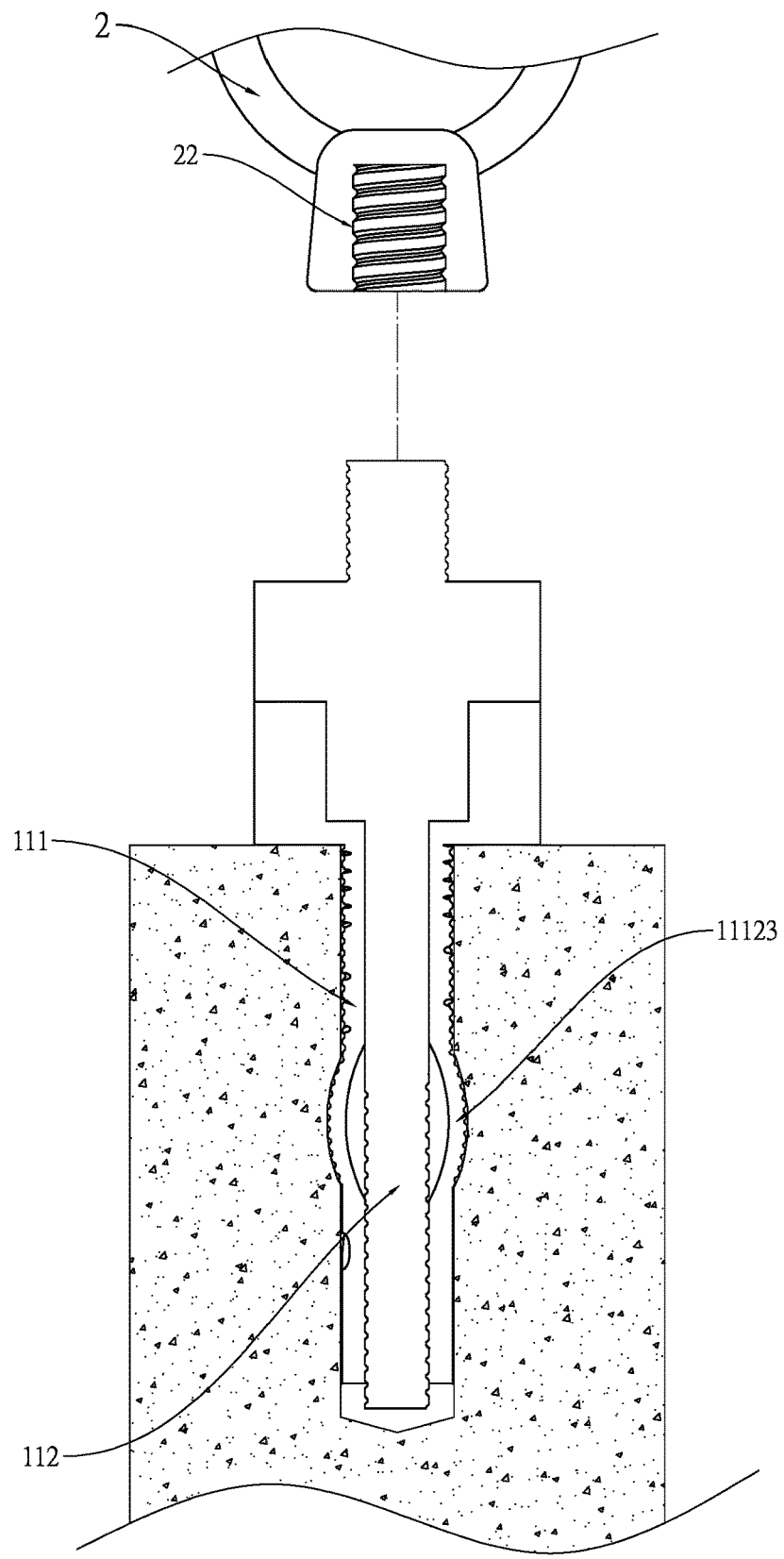
FIG. 28 is a view similar to FIG. 25 showing yet another configuration of the multifunction drill bit of FIG. 23.

Referring to FIGS. 15 and 16, a drill bit of a third preferred embodiment of the invention is shown. The characteristics of the third preferred embodiment are detailed below. Only an inner shank 112 and an outer shank 111 are used. After a hole has been drilled in a metal workpiece or concrete by a drilling machine, the outer shank 111 is inserted into the hole and the inner shank 112 is driven to deform the deformable section 11123, thereby fastening the drill bit in the metal workpiece or concrete.

Referring to FIGS. 17 to 22, a multifunction drill bit 1 of a fourth preferred embodiment of the invention is shown. The characteristics of the fourth preferred embodiment are detailed below. The shank 11 includes an outer shank 111 and an inner shank 112.

The outer shank 111 includes an outer lock head 1111, an outer shank body 1112 formed with the outer lock head 1111, and an axial hole 1113 through both the outer shank body 1112 and the outer lock head 1111. A plurality of spiral grooves 11121 are provided on the outer shank body 1112 for discharging chips. From a joining portion of the outer shank body 1112 and the outer lock head 1111 to the outer lock head 1111, there are sequentially provided a threaded section 11122, a deformable section 11123 and a guide section 11124. Each of the threaded section 11122 and the deformable section 11123 include first external threads 111221. The deformable section 11123 has a plurality of curved grooves 111231 on an outer surface. A deformable concave surface 111232 is provided on an inner surface of the deformable section 11123. A plurality of first internal threads 111241 are provided on an inner surface of the guide section 11124. Moreover, a pitch of the spiral grooves 11121 is increased as a distance to the tip of the outer shank 111 increases. An inclined angle θ of the spiral grooves 11121 with respect to a horizontal line is defined as $$60°-5°\times(\text{thread height calculated from end of guide section/diameter of outer shank}).$$

The number of the spiral grooves 11121 is at least two times of the number of each of the threaded section 11122 and the guide section 11124.

The inner shank 112 is provided in the axial hole 1113. The inner shank 112 includes an inner lock head 1121, an inner shank body 1122 formed with the inner lock head 1121, and an adapter section 1123 formed with the inner lock head 1121. A plurality of second external threads 11221 are provided on an inner surface of the guide section 11124 adjacent to an end (i.e., distal the inner lock head 1121) corresponding to the first internal threads 111241. A socket 11231 is provided on a top of the adapter section 1123. A plurality of first internal threads 112311 are provided on an inner surface of the socket 11231.

As shown in FIGS. 19 to 22 specifically, after a hole has been drilled in a metal workpiece or concrete by a drilling machine, the outer shank 111 is inserted into the hole and the outer lock head 1111 is rested on a top surface of a metal workpiece or concrete. A hand-held electric drill is used to rotate the adapter section 1123 and in turn, the inner shank 112 rotates. The guide section 11124 moves upward to continuously press the deformable section 11123, thereby deforming the deformable section 11123. After the deformable section 11123 has been deformed to a preset extent, the deformed deformable section 11123 is jammed at a bottom of the lower metal workpiece to fasten the workpieces, or in the concrete to fasten the multifunction drill bit 1 in the concrete. Finally, external threads 21 of a tool 2 are secured to the internally threaded socket 11231 and next the tool 2 is driven to achieve one of a plurality of different tasks (see FIGS. 21 and 22).

Referring to FIGS. 23 to 28, a multifunction drill bit 1 of a fifth preferred embodiment of the invention is shown. The characteristics of the fifth preferred embodiment are detailed below. The shank 11 includes an outer shank 111 and an inner shank 112.

The outer shank 111 includes an outer lock head 1111, an outer shank body 1112 formed with the outer lock head 1111, and an axial hole 1113 through both the outer shank body 1112 and the outer lock head 1111. A plurality of spiral grooves 11121 are provided on the outer shank body 1112 for discharging chips. From a joining portion of the outer shank body 1112 and the outer lock head 1111 to the outer lock head 1111, there are sequentially provided a threaded section 11122, a deformable section 11123 and a guide section 11124. Each of the threaded section 11122 and the deformable section 11123 include first external threads 111221. The deformable section 11123 has a plurality of curved grooves 111231 on an outer surface. A deformable concave surface 111232 is provided on an inner surface of the deformable section 11123. A plurality of first internal threads 111241 are provided on an inner surface of the guide section 11124. Moreover, a pitch of the spiral grooves 11121 is increased as a distance to the tip of the outer shank 111 increases. An inclined angle θ of the spiral grooves 11121 with respect to a horizontal line is defined as $$60°-5°\times(\text{thread height calculated from end of guide section/diameter of outer shank}).$$

The number of the spiral grooves 11121 is at least two times of the number of each of the threaded section 11122 and the guide section 11124.

The inner shank 112 is provided in the axial hole 1113. The inner shank 112 includes an inner lock head 1121, an inner shank body 1122 formed with the inner lock head 1121, and an adapter section 1123 formed with the inner lock head 1121. A plurality of second external threads 11221 are provided on an inner surface of the guide section 11124 adjacent to an end (i.e., distal the inner lock head 1121) corresponding to the first internal threads 111241. A projecting connection rod 11232 is provided on a top of the adapter section 1123. A plurality of fourth external threads 112321 are provided on an outer surface of the connection rod 11232.

As shown in FIGS. 25 to 28 specifically, after a hole has been drilled in a metal workpiece or concrete by a drilling machine, the outer shank 111 is inserted into the hole and the outer lock head 1111 is rested on a top surface of a metal workpiece or concrete. A hand-held electric drill is used to rotate the adapter section 1123 and in turn, the inner shank 112 rotates. The guide section 11124 moves upward to continuously press the deformable section 11123, thereby deforming the deformable section 11123. After the deformable section 11123 has been deformed to a preset extent, the deformed deformable section 11123 is jammed at a bottom of the lower metal workpiece to fasten the workpieces, or in the concrete to fasten the multifunction drill bit 1 in the concrete. Finally, internal threads 22 of a tool 2 are secured to the externally threaded connection rod 11232 and next the tool 2 is driven to achieve one of a plurality of different tasks (see FIGS. 27 and 28).

Figure 2:
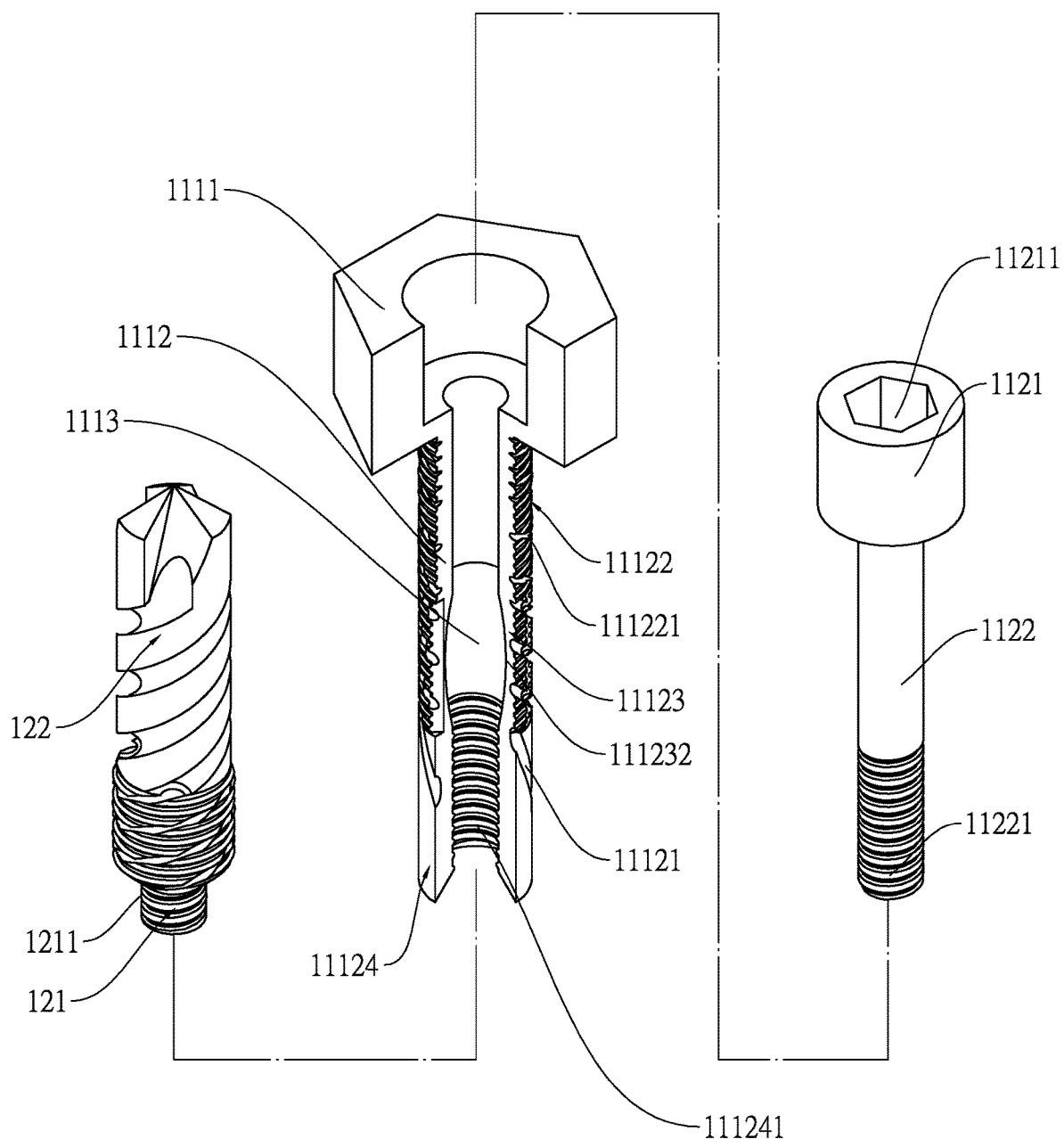
FIG. 2 is an exploded view of the multifunction drill bit.
Figure 29:
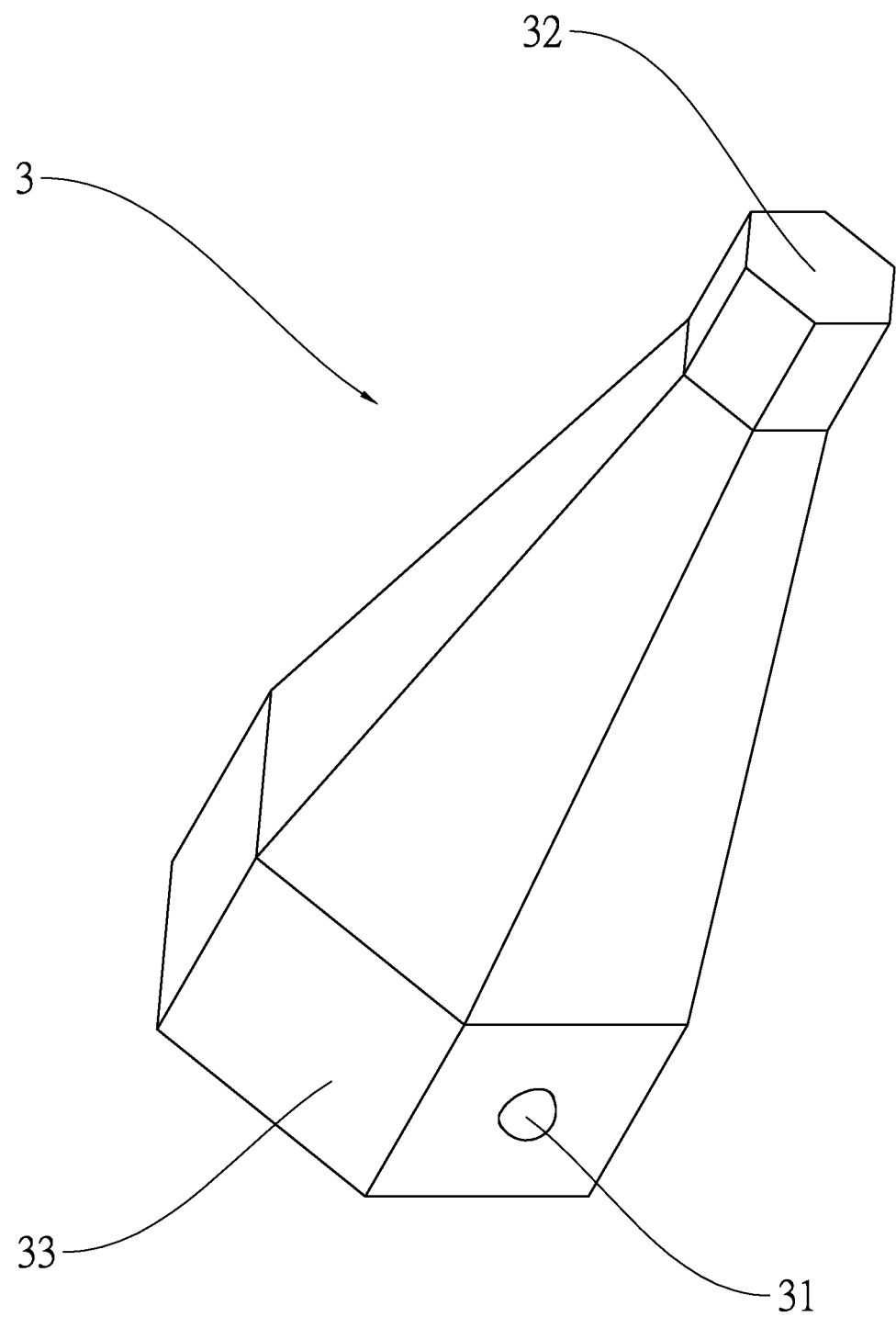
FIG. 29 is a perspective view of an adapter according to a first preferred embodiment of the invention.

Referring to FIG. 29 in conjunction with FIG. 2, an adapter 3 of a first preferred embodiment of the invention is shown. The adapter 3 is adapted to use with the drill bit of one of the first preferred embodiment to the fifth preferred embodiment for fastening purpose. In use, only one electric tool is used to rotate the outer shank 111 or the inner shank 112 rather than two electric tools are used to rotate the outer shank 111 and the inner shank 112 respectively. The adapter 3 includes a large hexagonal base 33, a small hexagonal top 32 and a hexagonal intermediate portion. The large hexagonal base 33 serves as a joining portion attached to an electric tool and includes a spring biased steel ball 31 for attaching the adapter 3 to the electric tool. The small hexagonal top 32 is inserted into the socket 11211 so that the inner shank 112 can be rotated when the electric tool is activated.

Operation of a drill bit in cooperation with the adapter 3 is described below. An electric tool is used to rotate the outer lock head 1111 and after a hole has been drilled in a metal workpiece or concrete, the large hexagonal base 33 is inserted into a socket of the electric tool and the spring biased steel ball 31 is disposed and positioned in an aperture of the electric tool; and the small hexagonal top 32 is inserted into the socket 11211. The electric drill activates to rotate the adapter 3 and in turn, the inner shank 112 rotates to deform the deformable section 11123.

Figure 30:
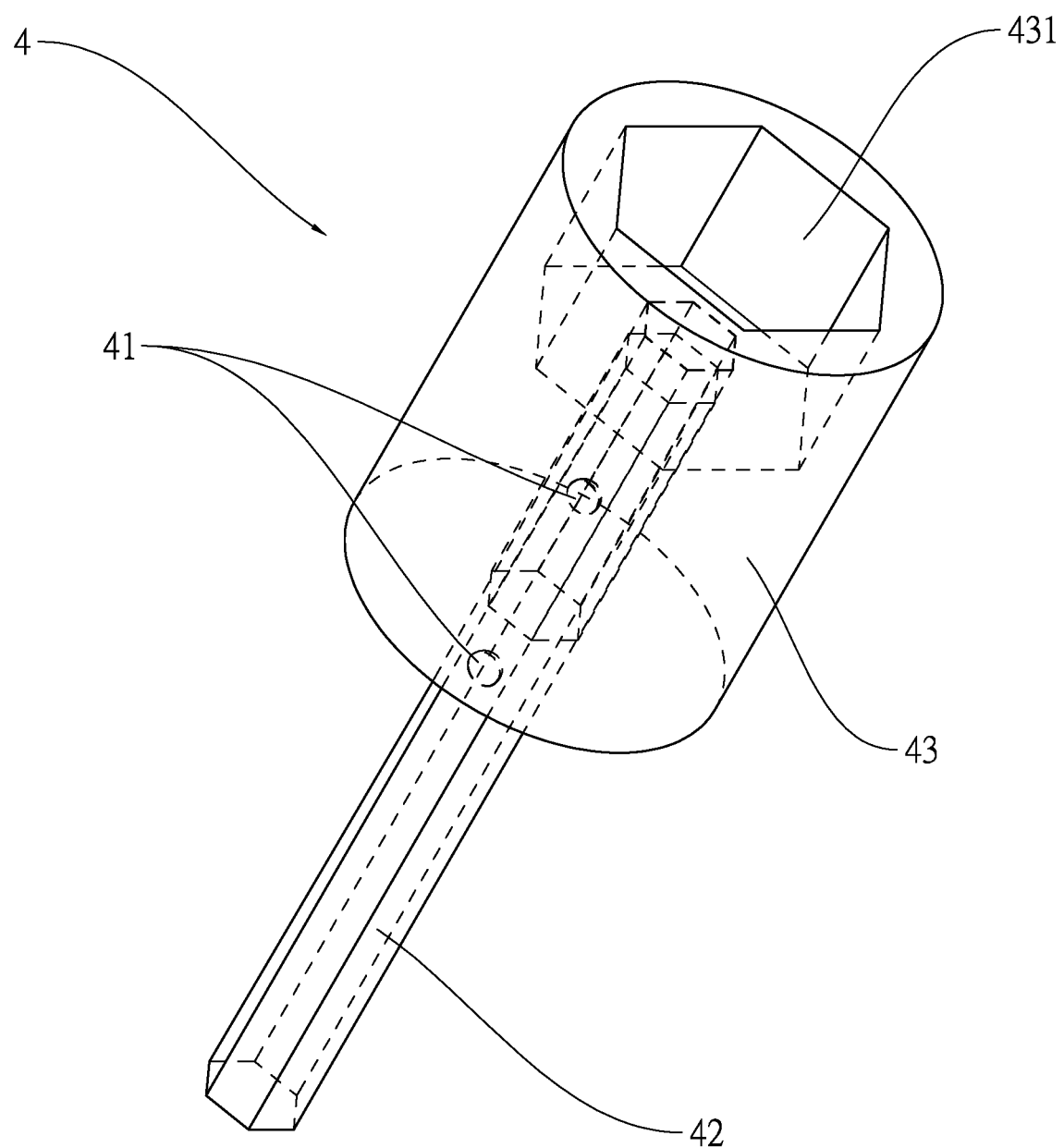
FIG. 30 is a perspective view of an adapter according to a second preferred embodiment of the invention.

Referring to FIG. 30 in conjunction with FIG. 2, an adapter 4 of a second preferred embodiment of the invention is shown. The adapter 4 is adapted to use with the drill bit of one of the first preferred embodiment to the fifth preferred embodiment for fastening purpose. In use, only one electric tool is used to rotate the outer shank 111 or the inner shank 112 rather than two electric tools are used to rotate the outer shank 111 and the inner shank 112 respectively. The adapter 4 includes a sleeve 43 having two opposite spring biased steel balls 41 for attaching the adapter 4 to the electric tool, a hexagonal shaft 42 moveably extending out of a bottom and configured to insert into the socket 11211 to rotate the inner shank 112, the shaft 42 being adapted to co-rotate with the sleeve 43, and a hexagonal socket 431 on a top of the sleeve 43, the socket 431 adapted to receive the outer lock head 1111.

Operation of a drill bit in cooperation with the adapter 4 is described below. A socket has the same size and shape as the outer lock head 1111 is chosen. The end of the shaft 42 is inserted into the socket. The outer lock head 1111 is inserted into the socket 431. The outer shank 111 is driven into a metal workpiece or concrete. Next, the end of the shaft 42 is pulled to project a portion of the shaft 42 out of the sleeve 43. Next, the shaft 42 is inserted into the socket 11211. Finally, the electric drill activates to rotate the adapter 4 and in turn, the inner shank 112 rotates to deform the deformable section 11123.

Figure 31:
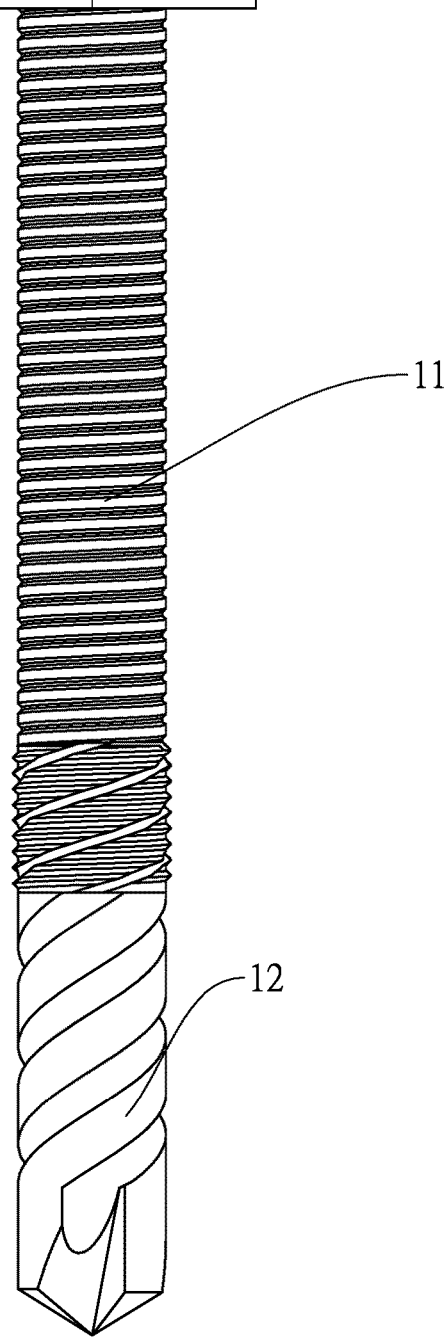
FIG. 31 is a side elevation of a shank of a first preferred embodiment of the invention.

Referring to FIG. 31 in conjunction with FIGS. 5 and 11, a shank 11 of a first preferred embodiment of the invention is shown. The shank 11 is a typical threaded shank and has an end threadedly secured to the third external threads 1211 of the joining section 121 of the replaceable tip 12.

Figure 32:
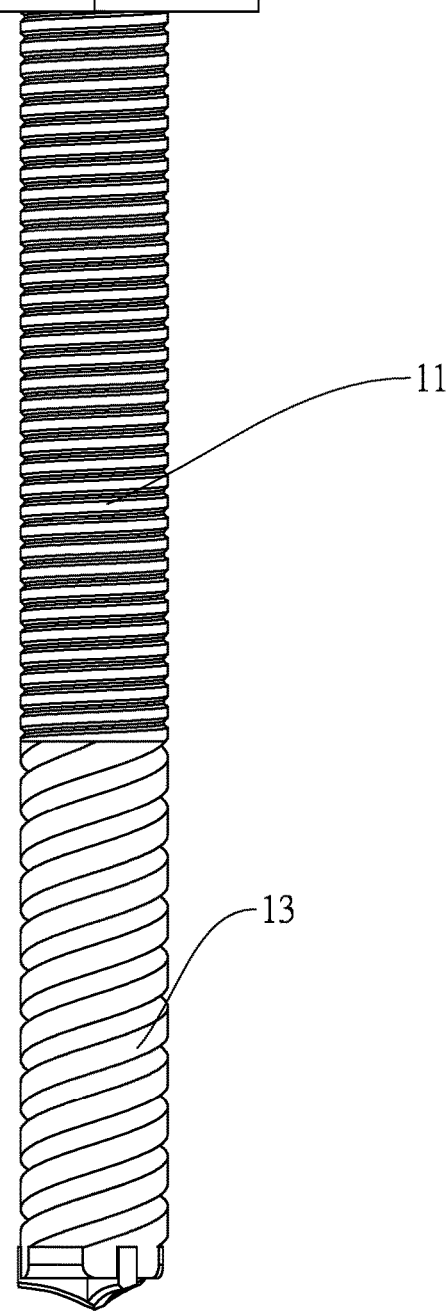
FIG. 32 is a side elevation of a shank of a second preferred embodiment of the invention.

Referring to FIG. 32 in conjunction with FIGS. 5 and 11, a shank 11 of a second preferred embodiment of the invention is shown. The shank 11 is a typical threaded shank and has an end threadedly secured to the third external threads 1311 of the joining section 131 of the replaceable tip 13.

In each of the embodiments shown in FIGS. 31 and 32, the typical threaded shank is converted into a drill bit for drilling a metal workpiece or concrete.

The multifunction drill bit of the invention has the following advantageous effects in comparison with the prior art: the tip can be replaced with one appropriate for drilling a hole through metal workpieces and fastening same or one appropriate for drilling a hole in concrete and being fastened therein based on a kind of target. Thus, a single operation can not only drill a hole but also fasten the target.

While the invention has been described in terms of preferred embodiments, those skilled in the art will recognize that the invention can be practiced with modifications within the spirit and scope of the appended claims.

What is claimed is:

1. A multifunction drill bit comprising:
an outer shank including an outer lock head, an outer shank body formed with the outer lock head, and an axial hole through both the outer shank body and the outer lock head wherein a plurality of spiral grooves are provided on the outer shank body for discharging chips; a threaded section proximate the outer lock head, a deformable section, and a guide section are sequentially provided on the outer shank body; each of the threaded section and the deformable section include first external threads; the deformable section has a plurality of linear grooves on an outer surface; a deformable concave surface is provided on an inner surface of the deformable section; and a plurality of first internal threads are provided on an inner surface of the guide section;
an inner shank provided in the axial hole and including an inner lock head and an inner shank body formed with the inner lock head wherein a socket is provided on a top of the inner lock head; and
a tip releasably secured to an end of the guide section, the tip being configured to drill a metal workpiece and including a joining section and a drilling section formed with the joining section wherein a plurality of second external threads are provided on an outer surface of the joining section corresponding to the first internal threads; the drilling section sequentially includes a cutting surface, a plurality of spirals, and a plurality of threads proximate the joining section, the cutting surface includes a first cutting face, a second cutting face, and a third cutting face; and a plurality of spiral grooves are provided on the threads for discharging chips.

* * * * *